United States Patent
Ueyama et al.

(10) Patent No.: US 9,008,940 B2
(45) Date of Patent: Apr. 14, 2015

(54) VEHICLE CONTROL DEVICE AND VEHICLE CONTROL METHOD

(75) Inventors: Mikio Ueyama, Shimotsuga-gun (JP); Tatsuya Yoshida, Naka (JP); Kazuhiko Hanawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1029 days.

(21) Appl. No.: 12/279,943

(22) PCT Filed: Mar. 6, 2006

(86) PCT No.: PCT/JP2006/304814
§ 371 (c)(1), (2), (4) Date: Feb. 2, 2009

(87) PCT Pub. No.: WO2007/102228
PCT Pub. Date: Sep. 13, 2007

(65) Prior Publication Data
US 2009/0228184 A1 Sep. 10, 2009

(51) Int. Cl.
*B60W 30/16* (2012.01)
*B60W 30/095* (2012.01)
(Continued)

(52) U.S. Cl.
CPC .............. *B60W 30/16* (2013.01); *B60W 30/095* (2013.01); *G08G 1/16* (2013.01); *G08G 1/161* (2013.01);
(Continued)

(58) Field of Classification Search
CPC .......... B60W 30/16; B60W 2550/143; B60W 2540/12; B60W 30/08; B60W 10/20; B60W 2550/14; B60W 2750/30; B60W 30/12; B60W 30/14; B60W 2550/10; B60W 2550/141; B60W 2550/306; B60W 2750/308; B60W 2550/30

USPC ................... 701/1, 70, 93, 96, 300, 301, 302; 340/435, 903, 988
See application file for complete search history.

(56) References Cited

U.S. PATENT DOCUMENTS 5,631,639 A * 5/1997 Hibino et al. ................. 340/903
5,689,264 A * 11/1997 Ishikawa et al. ................ 342/70
(Continued)

FOREIGN PATENT DOCUMENTS

DE 102 58 167 A1 7/2003
EP 0 760 485 A1 3/1997
(Continued)

OTHER PUBLICATIONS

European Search Report dated Jan. 30, 2009 (Seven (7) pages).
(Continued)

*Primary Examiner* — John R Olszewski
*Assistant Examiner* — Truc M Do
(74) *Attorney, Agent, or Firm* — Crowell & Moring LLP

(57) ABSTRACT

A cruise control device and an obstacle detection device are provided which achieve a safe and appropriate tracking control by avoiding a sudden recognition of a short following distance when a preceding vehicle is found in an uphill or downhill gradient, in a curve, or at an intersection, or by reducing the damage of a crash when the crash cannot be avoided. An obstacle determination process section is provided which receives information from a sensor which detects an obstacle, receives terrain information of the position of the host vehicle from a navigation device, and determines the presence of the obstacle when a predetermined condition is satisfied after the sensor detects the obstacle. The predetermined condition to determine the presence of the obstacle is changed based on the terrain information of the position of the host vehicle received from the navigation device.

10 Claims, 30 Drawing Sheets

(51) Int. Cl.
*G08G 1/16* (2006.01)
*B60W 30/09* (2012.01)

(52) U.S. Cl.
CPC .......... *B60W 30/09* (2013.01); *B60W 2550/143* (2013.01); *B60W 2550/20* (2013.01); *B60W 2550/402* (2013.01)

(56) References Cited

U.S. PATENT DOCUMENTS

| | | | |
|---|---|---|---|
| 5,798,727 A * | 8/1998 | Shirai et al. | 342/70 |
| 6,169,940 B1 * | 1/2001 | Jitsukata et al. | 701/23 |
| 6,246,949 B1 * | 6/2001 | Shirai et al. | 701/96 |
| 6,311,120 B1 * | 10/2001 | Asada | 701/96 |
| 6,405,120 B1 * | 6/2002 | Higashimata et al. | 701/96 |
| 6,405,132 B1 * | 6/2002 | Breed et al. | 701/301 |
| 6,415,226 B1 * | 7/2002 | Kozak | 701/411 |
| 6,487,500 B2 * | 11/2002 | Lemelson et al. | 701/301 |
| 6,768,944 B2 * | 7/2004 | Breed et al. | 701/301 |
| 6,810,319 B2 * | 10/2004 | Manaka | 701/96 |
| 6,941,216 B2 * | 9/2005 | Isogai et al. | 701/96 |
| 7,124,027 B1 * | 10/2006 | Ernst et al. | 701/301 |
| 7,729,840 B2 * | 6/2010 | Nishira et al. | 701/70 |
| 8,311,720 B2 * | 11/2012 | Pelosse | 701/96 |
| 2003/0109980 A1 * | 6/2003 | Kojima et al. | 701/96 |
| 2003/0217880 A1 * | 11/2003 | Isogai et al. | 180/170 |
| 2004/0010362 A1 * | 1/2004 | Michi et al. | 701/93 |
| 2005/0125153 A1 * | 6/2005 | Matsumoto et al. | 701/300 |
| 2005/0143895 A1 * | 6/2005 | Kato | 701/96 |
| 2006/0015240 A1 * | 1/2006 | Shima | 701/93 |
| 2006/0095192 A1 * | 5/2006 | Uhler et al. | 701/96 |
| 2007/0005218 A1 * | 1/2007 | Ueyama | 701/96 |
| 2007/0030131 A1 * | 2/2007 | Takahama et al. | 340/435 |
| 2007/0154068 A1 * | 7/2007 | Stein et al. | 382/106 |
| 2007/0215401 A1 * | 9/2007 | Braeuchle et al. | 180/170 |
| 2008/0004807 A1 * | 1/2008 | Kimura et al. | 701/301 |
| 2008/0033621 A1 * | 2/2008 | Nakamura et al. | 701/65 |
| 2008/0117093 A1 * | 5/2008 | Ichiyanagi et al. | 342/104 |
| 2008/0169969 A1 * | 7/2008 | Shirai | 342/107 |
| 2009/0037071 A1 * | 2/2009 | Inoue | 701/96 |
| 2010/0179741 A1 * | 7/2010 | Pelosse | 701/96 |

FOREIGN PATENT DOCUMENTS

| | | |
|---|---|---|
| EP | 1 302 747 A1 | 4/2003 |
| JP | 8-122432 A | 5/1996 |
| JP | 8-216726 A | 8/1996 |
| JP | 10-206532 A | 8/1998 |
| JP | 2001-270344 A | 10/2001 |
| JP | 2002-248964 A | 9/2002 |
| JP | 2003-39979 A | 2/2003 |
| JP | 2003-141698 A | 5/2003 |
| JP | 2004-249891 A | 9/2004 |
| JP | 2006-44591 A | 2/2006 |

OTHER PUBLICATIONS

International Search Report dated Jun. 6, 2006 including English translation of the relevant portion (Four (4) pgaes).

* cited by examiner

FIG.1A

FREE RUNNING DISTANCE
(AT A SPEED OF 65 km/h)

| RUNNING TIME (s) | RUNNING DISTANCE (m) |
|---|---|
| 0.6 | 10.8 |
| 1.0 | 18.1 |
| 2.0 | 36.1 |
| 3.0 | 54.2 |

FIG.1B

DECELERATED SPEED
(AT A DECELERATION OF 0.8g)

| DECELERATION TIME (s) | DECELERATION SPEED (km/h) |
|---|---|
| 0.6 | 4.7 |
| 1.0 | 7.8 |
| 2.0 | 15.7 |
| 3.0 | 23.5 |

FIG.4A  PRECEDING VEHICLE HAS NOT BEEN FOUND.
FIG.4B  PRECEDING VEHICLE IS VISUALLY FOUND.
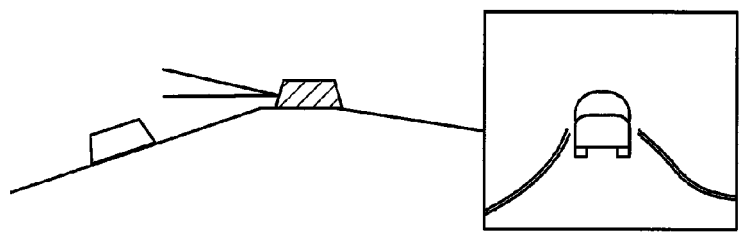
FIG.4C  SENSOR STARTS TO DETECT PRECEDING VEHICLE.
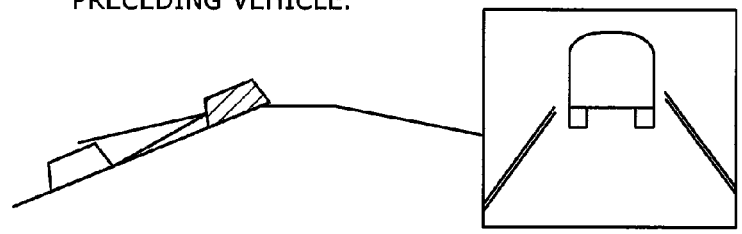
FIG.4D  SENSOR DETERMINES PRESENCE OF PRECEDING VEHICLE.

FIG. 13A GRADIENT DIFFERENCE
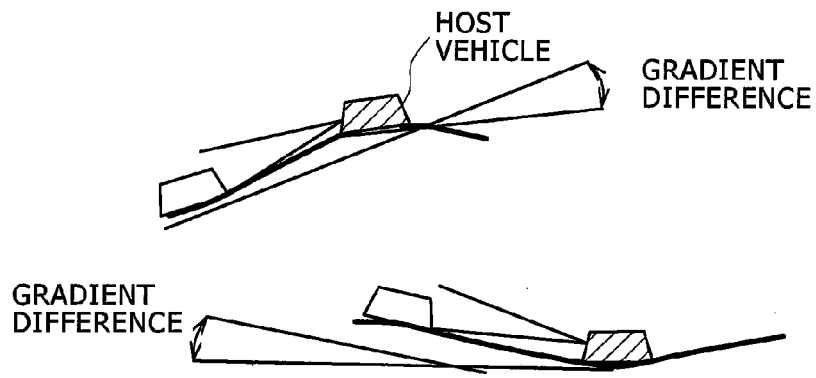
FIG. 13B TRAVELING-DIRECTION DIFFERENCE
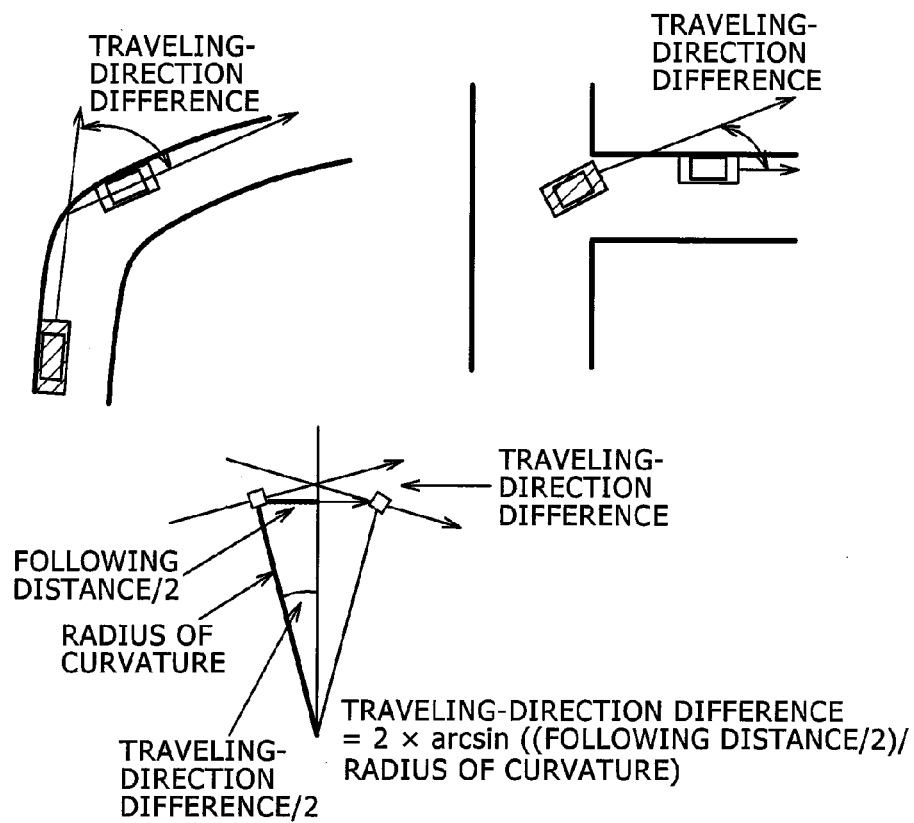
TRAVELING-DIRECTION DIFFERENCE = 2 × arcsin ((FOLLOWING DISTANCE/2)/ RADIUS OF CURVATURE)

PRECEDING VEHICLE HAS NOT BEEN FOUND

DETECTION OF PRECEDING VEHICLE IS STARTED

DETECTION OF PRECEDING VEHICLE IS DETERMINED

PRECEDING VEHICLE HAS NOT BEEN FOUND

DETECTION OF PRECEDING VEHICLE IS STARTED 1

DETECTION OF PRECEDING VEHICLE IS STARTED 2

DETERMINATION OF PRECEDING VEHICLE IS STARED

PRECEDING VEHICLE IS DETERMINED

FIG. 17A CONVENTIONAL DETECTION TIMING CHART
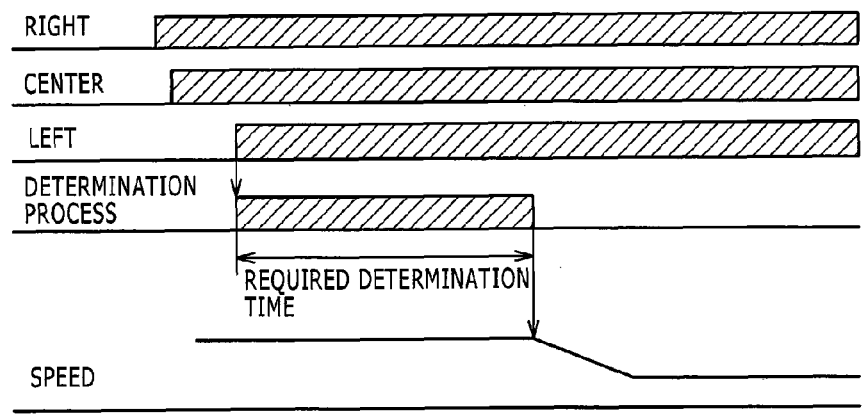
FIG. 17B DETECTION TIMING CHART OF THIS INVENTION
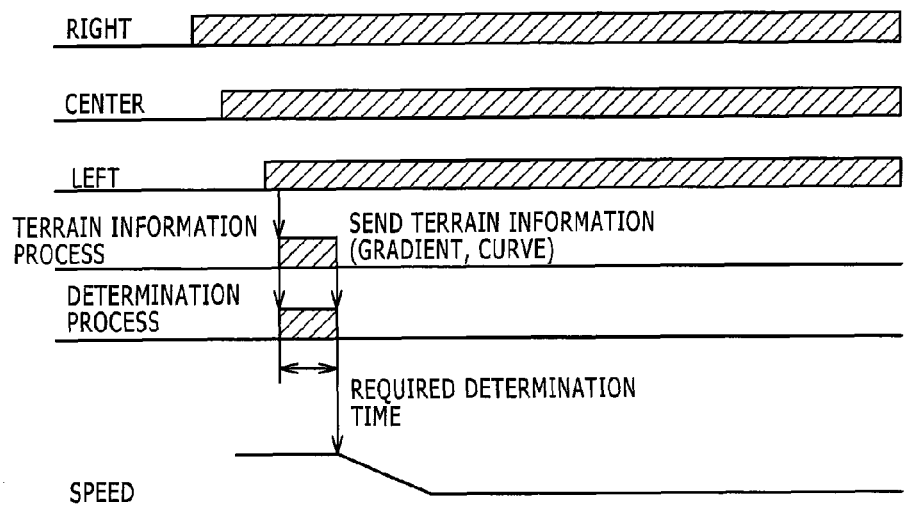

Z-DIRECTION MEASUREMENT DISTANCE: $Z = bf/\delta$
X-DIRECTION MEASUREMENT DISTANCE: $X = (b/2)(xl+xr)(xl-xr)$ xl: POSITION IN LEFT IMAGING AREA
xr: POSITION IN RIGHT IMAGING AREA
$\delta$: POSITION SHIFT (PARALLAX) AT IMAGING AREAS
　　$\delta = xr - xl$
f: FOCAL DISTANCE
b: BASE LENGTH (DISTANCE BETWEEN CAMERAS)

FIG.22

| EXAMPLE SENSORS | EXAMPLE DETERMINATION CONDITIONS |
|---|---|
| LASER RADAR | WHEN THREE POINTS ON THE REAR OF AN OBSTACLE ARE DETECTED BY LASER BEAMS FOR SEVERAL SECONDS.<br>IF A TERRAIN CONDITION IS ESTABLISHED, THE REQUIRED DETERMINATION TIME IS REDUCED.<br>IN A CURVE, THE OBSTACLE MAY BE DETERMINED WHEN TWO POINTS ON THE REAR OF THE OBSTACLE, SUCH AS THE LEFT AND CENTER PARTS OR THE RIGHT AND CENTER PARTS THEREON, ARE DETECTED FOR THE REQUIRED DETERMINATION TIME. |
| STEREO CAMERA | WHEN AN OBSTACLE OBTAINED THROUGH GROUPING IS DETECTED IN FRONT OF THE HOST VEHICLE FOR SEVERAL SECONDS.<br>IF A TERRAIN CONDITION IS ESTABLISHED, THE REQUIRED DETERMINATION TIME IS REDUCED.<br>IN A CURVE, THE OBSTACLE MAY BE DETERMINED WHEN THE OBSTACLE EXISTS IN ITS LEFT OR RIGHT DIRECTION FOR THE REQUIRED DETERMINATION TIME.<br>IN A GRADIENT, THE OBSTACLE MAY BE DETERMINED WHEN THE OBSTACLE IS RECOGNIZED FOR THE REQUIRED DETERMINATION TIME WITH HEIGHT CRITERION FOR THE OBSTACLE REDUCED. |
| MILLIMETER WAVE RADAR | WHEN AN OBSTACLE FROM WHICH A STRONG REFLECTED RADIO WAVE IS RETURNED IS DETECTED IN FRONT OF THE HOST VEHICLE FOR THE REQUIRED DETERMINATION TIME.<br>IF A TERRAIN CONDITION IS ESTABLISHED, THE REQUIRED DETERMINATION TIME IS REDUCED.<br>IN A CURVE, THE OBSTACLE MAY BE DETERMINED WHEN THE OBJECT EXISTS IN ITS LEFT OR RIGHT DIRECTION FOR THE REQUIRED DETERMINATION TIME. |

FIG.26
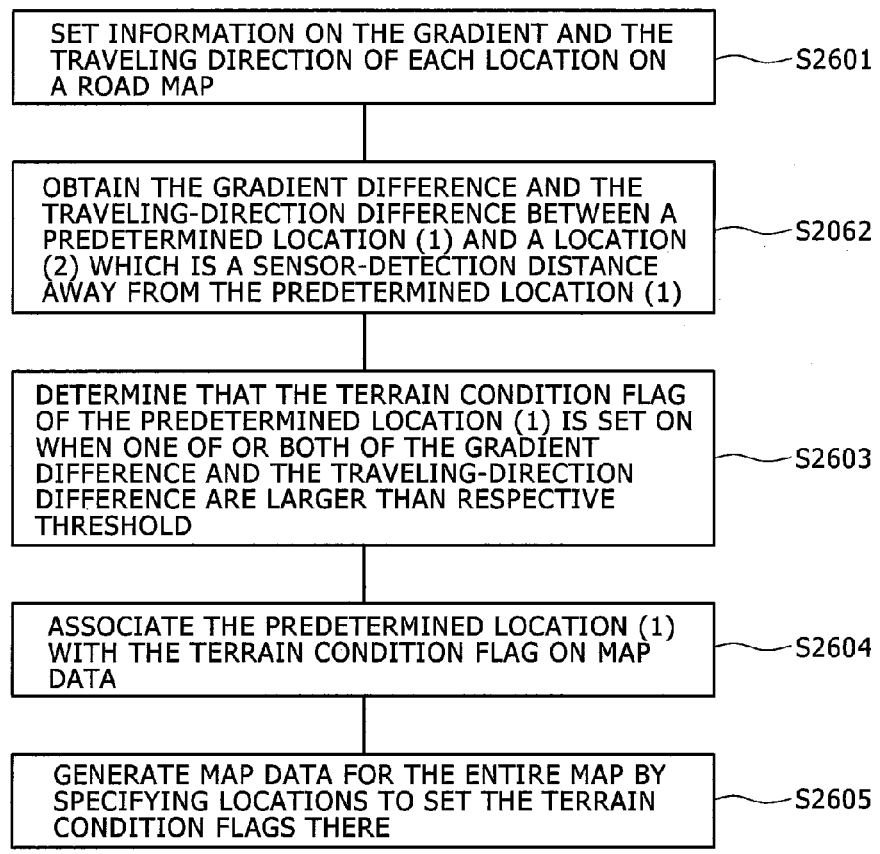
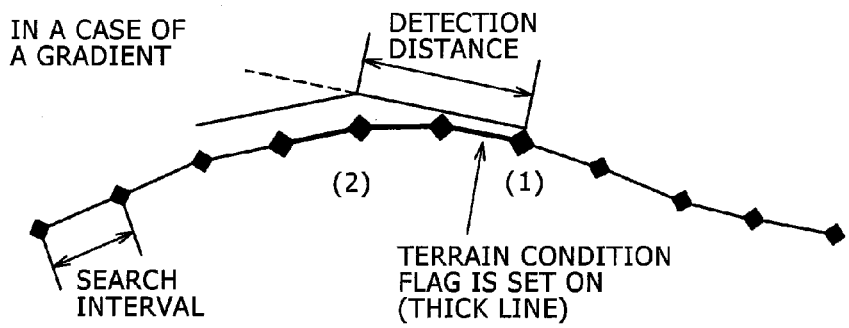

FIG.32

| ①ALARMING | •SOUND, BUZZER<br>•SCREEN DISPLAY |
|---|---|
| ②PRELIMINARY DECELERATION | •APPLY NO ACCELERATION<br>•MINIMIZE THE GAP FOR THE BRAKE PAD<br>•ELIMINATE LOOSENESS OF THE SEATBELT |
| ③DECELERATION | •APPLY THE BRAKE<br>•TIGHTEN THE SEATBELT<br>•SHIFT TO A LOWER GEAR |

CALCULATE TIME TO COLLISION (TTC) WITH THE PRECEDING VEHICLE TO USE TTC FOR ① ALARMING, ② PRELIMINARY DECELERATION, AND ③ DECELERATION

TIME TO COLLISION (TTC) CALCULATION FOMULA
•TTC=RELATIVE DISTANCE TO PRECEDING VEHICLE/RELATIVE SPEED THERETO
•CALCULATE TTC FROM THE FOLLOWING FOMULA (ACCELERATION IS TAKEN INTO ACCOUNT)
RELATIVE DISTANCE + PRECEDING-VEHICLE SPEED × TTC + 0.5 × PRECEDING-VEHICLE ACCELERATION × TTC × TTC = HOST-VEHICLE SPEED × TTC + 0.5 × HOST-VEHICLE ACCELERATION × TTC × TTC

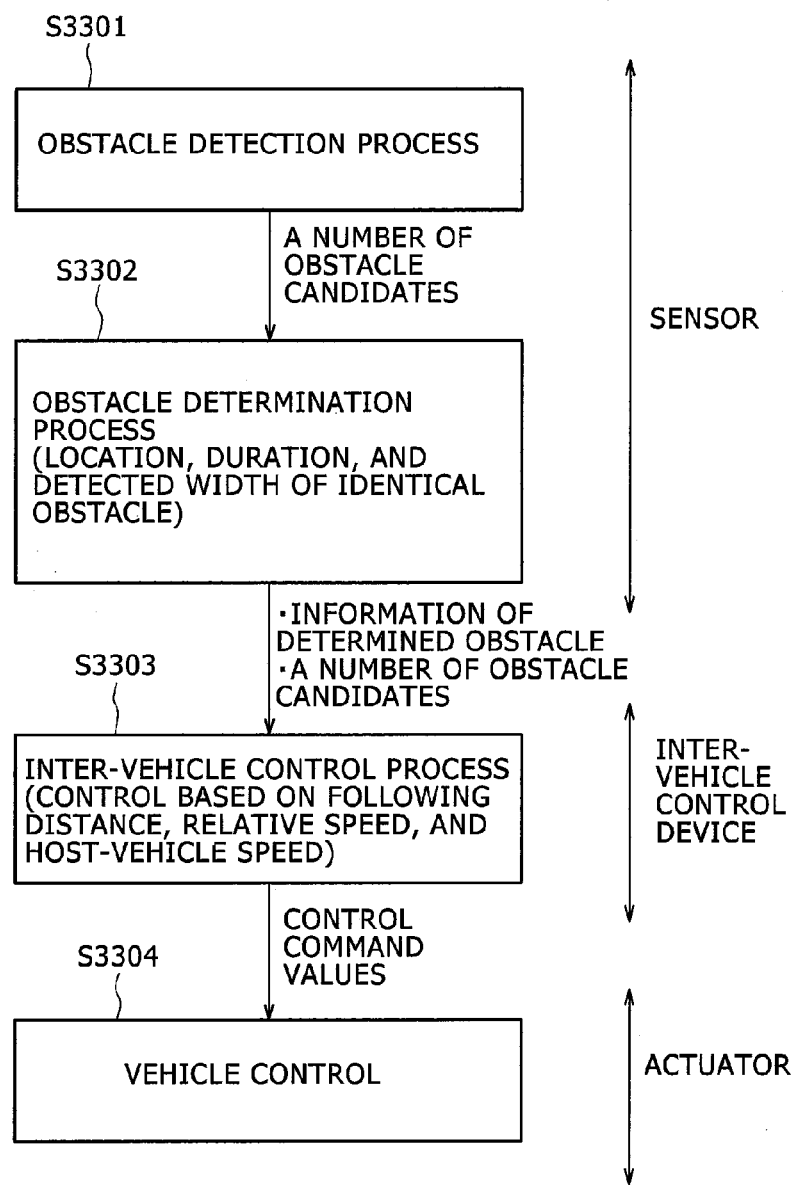

VEHICLE CONTROL DEVICE AND VEHICLE CONTROL METHOD

FIELD OF THE INVENTION

The present invention relates to a vehicle control device and a vehicle control method. In particular, the present invention is preferably applied to vehicles provided with means for detecting obstacles, a vehicle in front (a preceding vehicle), and the like.

BACKGROUND OF THE INVENTION

An adaptive cruise control device (hereinafter, referred to as ACC device) realizes a function in which a driver can specify a target speed and a target distance to the preceding vehicle (a target following distance) through an input and output display unit, and a function of, when there is no preceding vehicle, controlling the actual speed so as to match the target speed and of, when there is a preceding vehicle, following the preceding vehicle while maintaining the target following distance. The ACC device is conventionally intended to be used in express highways, but is now increasingly used in general roads which have more curves and undulations. However, in a case where a preceding vehicle or a stationary object exists beyond an uphill gradient but cannot be seen, when the host vehicle reaches at the top of the gradient, the preceding vehicle or the stationary object suddenly comes into sight. Accordingly, it is difficult for the ACC device to rapidly reduce the speed, giving a feeling of danger in some cases. The ACC device usually requires several seconds to recognize a preceding vehicle. The presence of the preceding vehicle is continuously checked for the several seconds to judge whether the preceding vehicle is finally determined. Control commands are issued to an alarming device and actuators (such as an accelerator, a transmission, and a brake), based on the determination result. Therefore, through a usual preceding vehicle determination process, timing to start deceleration is delayed because the presence of the preceding vehicle needs to be checked for several seconds. Further, when the host vehicle is driven from a downhill gradient to an uphill gradient and finds a preceding vehicle located in the uphill gradient, timing to start deceleration is also delayed because the sensor uses a required determination time to check the presence of the preceding vehicle although the preceding vehicle has been visually found.

In short, with current ACC devices and crash reduction braking devices, braking tends to be used later than when the driver brakes the host vehicle after visual recognition. Since the preceding vehicle has come into sight of the driver, it is necessary for the driver to rapidly start deceleration.

Since a pre-crash speed is a key in cruise control systems, especially, in crash reduction braking devices, reduction in detection time is important. FIGS. 1A and 1B show a running distance and a decelerated speed, respectively, calculated by the following formulae 1 and 2:

Running distance=host vehicle speed×running time     Formula 1

Decelerated speed=deceleration×running time     Formula 2

For example, when the host vehicle is driven at a speed of 65 kilometers per hour, the host vehicle runs 36.1 meters for two seconds as shown in FIG. 1A. Further, for two seconds, the speed of the host vehicle can be reduced by 15.7 kilometers per hour at a deceleration of 0.8 g. Since it is known that a death rate is reduced when the speed at crash is reduced to 50 kilometers per hour or below, the pre-crash speed needs to be reduced as low as possible. In other words, when the time required for crash judgment is reduced in seconds, a great effect is obtained.

Further, there is a known technique of using a navigation device to judge structures such as an ETC gate and a railroad crossing at an early stage and to find a preceding vehicle at an early stage according to the degree of road congestion (for example, see JP-A-2003-141698).

However, it is difficult to find a preceding vehicle in a gradient or in a curve at an early stage, and there is no invention of achieving prompt recognition of a preceding vehicle in a gradient or in a curve.

On the other hand, maps have been more precise in navigation devices, and it is known that terrain information is included in the navigation devices.

SUMMARY OF THE INVENTION

An object of the present invention is to provide a cruise control device and an obstacle detection device for achieving a safe and appropriate tracking control by reducing a sudden recognition of a short following distance when a preceding vehicle is found in an uphill or downhill gradient, in a curve, or at an intersection, or by reducing the damage of a crash when the crash cannot be avoided.

Therefore, obstacle detection information from a sensor that detects obstacles and terrain information of the position of the host vehicle from a map database are input; and if a process of determining the presence of an obstacle is performed when a given condition is satisfied after the sensor detects the obstacle, a condition to determine the presence of the obstacle is changed based on the terrain information of the position of the host vehicle.

Accordingly, it is possible to find early that a preceding vehicle exists at a position in a downhill gradient beyond an uphill gradient, a preceding vehicle exists at a position in an uphill gradient beyond a downhill gradient, and a preceding vehicle exists at a position beyond a curve or an intersection, so that a sudden recognition of a short following distance is reduced or the crash reduction braking device can be activated early, thereby performing more appropriate cruise control.

BRIEF DESCRIPTION OF THE DRAWINGS

FIG. 1A shows a running distance with respect to time and FIG. 1B shows a decelerated speed with respect to time, according to an embodiment of the present invention.

FIGS. 4A to 4D illustrate a case where the host vehicle passes through the vicinity of the top of a gradient and suddenly finds a preceding vehicle.

FIGS. 13A and 13B illustrate how to obtain gradient differences and traveling-direction differences.

FIGS. 17A to 17B are example timing charts of detection using the laser radar.

FIG. 22 shows example determination conditions used for respective sensors.

FIG. 26 shows a method of generating a map having terrain conditions.

FIG. 32 shows variations of alarming and braking.

FIG. 33 is another process flow (2) from sensor detection to vehicle control.

DETAILED DESCRIPTION OF THE PREFERRED EMBODIMENTS

Embodiments to be described below relate to an adaptive cruise control device, a crash reduction braking device, and a sensor used therein, and shows reduction in judging time required to determine a preceding vehicle by using a navigation device, when the preceding vehicle is detected in a gradient, in a curve, or at an intersection.

Figure 2:
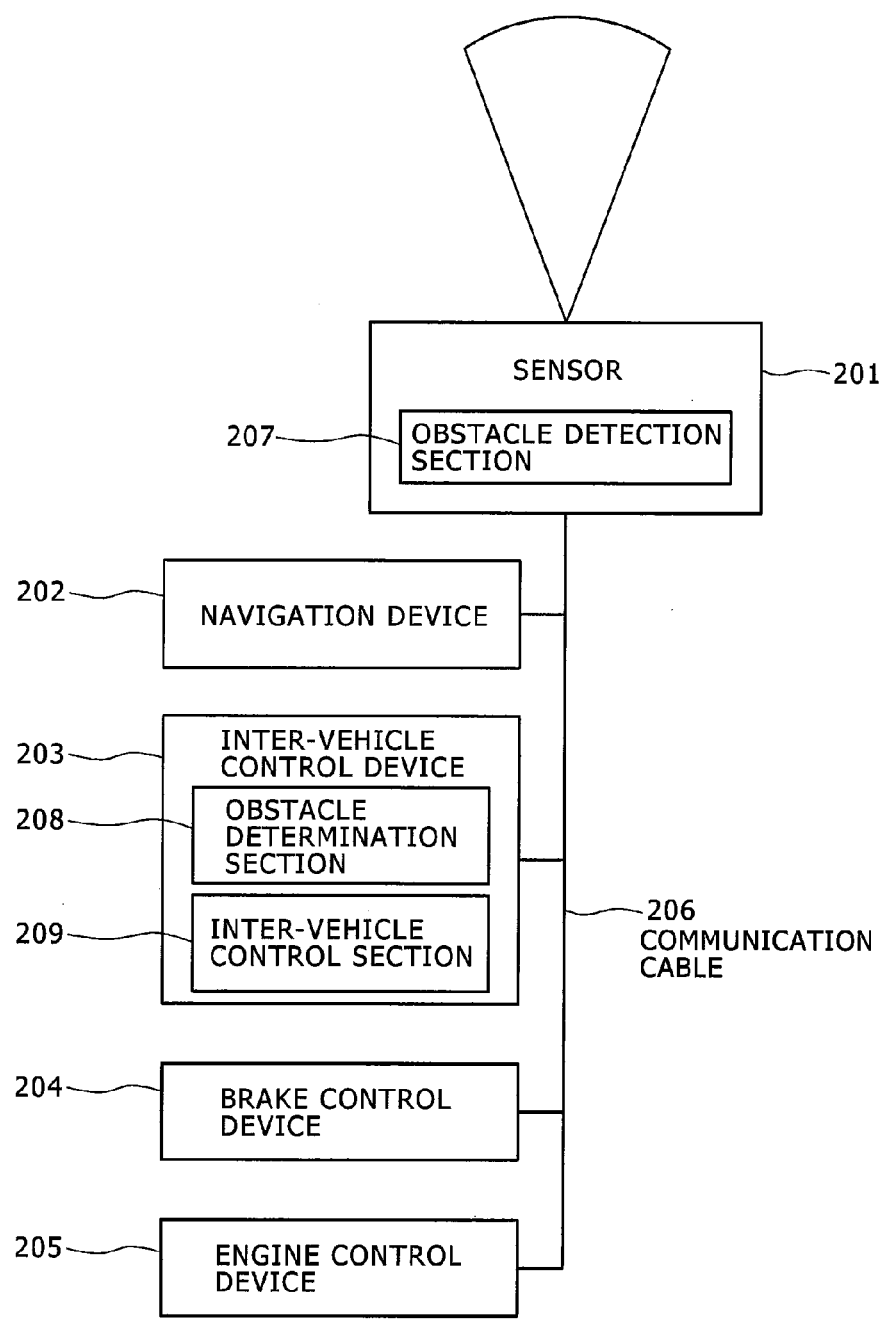
FIG. 2 is a block diagram of this embodiment.

As shown in a block diagram of FIG. 2, a cruise control device according to an embodiment of the present invention includes a sensor 201 that detects a following distance and a relative speed, a navigation device 202 that obtains terrain information of the position of the host vehicle and terrain information of the position of a preceding vehicle which is a following distance ahead of the host vehicle, on a map, an inter-vehicle control device 203 that performs constant speed control, following distance control, and pre-crash deceleration control, a brake control device 204, an engine control device 205, and a communication cable 206 that is used to exchange necessary data. The engine control device 205 performs transmission control. The sensor 201 includes an obstacle detection section 207 that performs an input process and a recognition process in the sensor 201.

The inter-vehicle control device 203 is realized mainly by software processing and includes an obstacle determination section 208 and an inter-vehicle control section 209. The obstacle determination section 208 may be included in the inter-vehicle control device 203 as in this example, or may be included in the sensor 201. A function of the inter-vehicle control device 203 may be included in the sensor 201, the navigation device 202, or another control unit.

Figure 3:
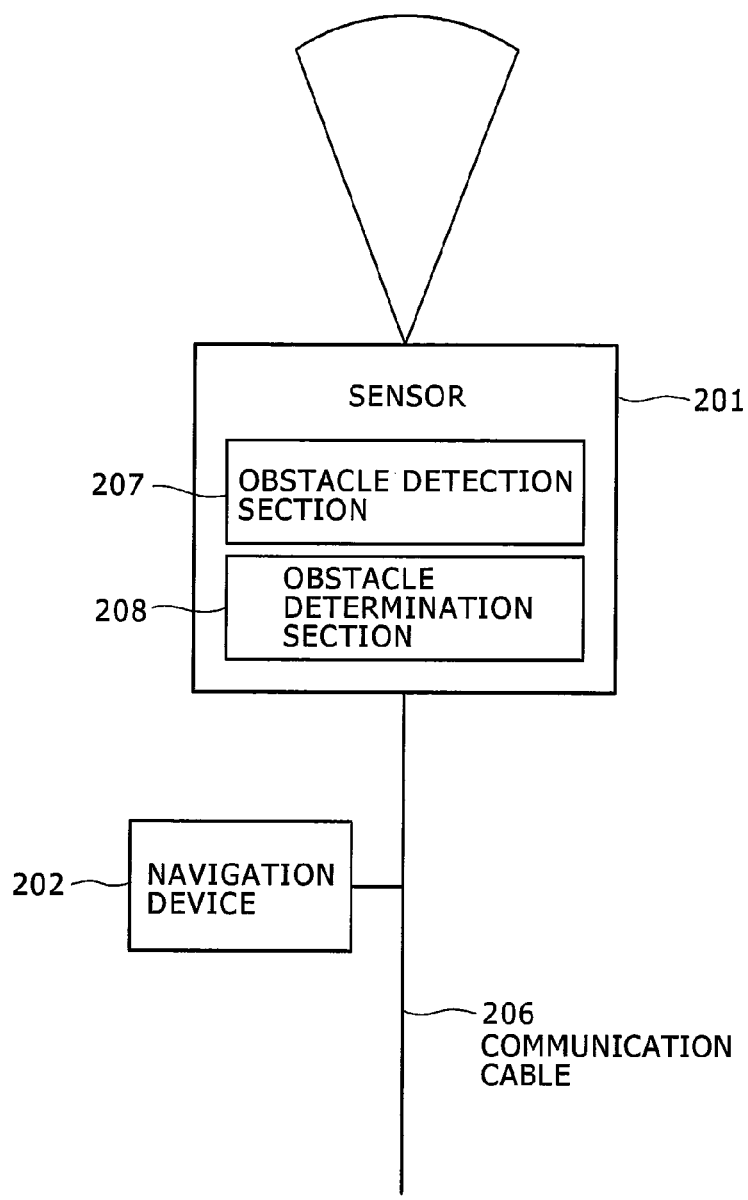
FIG. 3 is another block diagram (2) of this embodiment.

As shown in a block diagram of FIG. 3, an obstacle recognition device according to a first embodiment of the present invention includes the sensor 201 that detects a following distance and a relative speed, the navigation device 202 that serves as a map database to obtain terrain information of the position of the host vehicle and terrain information of the position of a preceding vehicle which is a following distance ahead of the host vehicle, on a map, and the communication cable 206 that is used to exchange necessary data. The sensor 201 includes the obstacle detection section 207 that performs an input process and a recognition process in the sensor 201, and the obstacle determination section 208 that determines the presence of an obstacle and sends a result to the inter-vehicle control device 203.

FIG. 2 shows the cruise control device according to the embodiment of the present invention, which includes the sensor 201 that detects the following distance and relative speed to a preceding vehicle, the navigation device 202 that obtains terrain information of the positions of the preceding vehicle and the host vehicle, the inter-vehicle control device 203 that controls the following distance, the brake control device 204 that controls a brake, the engine control device 205 that controls an engine, and the communication cable 206 that connects the above-mentioned devices. The engine control device 205 also performs transmission control. A controller area network (CAN) is used for communications performed between the above-mentioned devices via the communication cable 206. Information necessary for cruise control, such as the speed of the host vehicle, can be obtained constantly through the CAN. The sensor 201 includes the obstacle detection section 207 that performs an input process in the sensor 201. The sensor 201 sends an obstacle recognition and determination result to the inter-vehicle control device 203 via the CAN.

Instead of the CAN, a dedicated communication cable may be used to exchange data between the navigation device 202 and the sensor 201. Alternatively, data may be exchanged by radio. In either case, input sections that receive information from the sensor 201 and from the navigation device 202 need to be provided for the inter-vehicle control device 203. In a case of using the CAN or the dedicated communication cable, the input sections correspond to connectors connecting the cable. In a case of using radio, the input sections correspond to antennas. An input section that receives information from the navigation device 202 is called a terrain information input section, and an input section that receives information from the sensor 201 is called a sensor information input section.

Control processing of the obstacle determination section 208 of this embodiment is realized by software processing, and the software is stored in the sensor 201 or the navigation device 202.

Hereinafter, a conventional detection method and a conventional preceding vehicle determination process will be described.

FIGS. 4A to 4D illustrate a case where the host vehicle passes through the vicinity of the top of a gradient and suddenly finds a preceding vehicle. In FIGS. 4A to 4B, a hatched vehicle corresponds to the host vehicle and an outlined vehicle corresponds to another vehicle or the preceding vehicle (the same applies to the drawings to be referred to below). In FIG. 4A, the preceding vehicle has not been found.

In FIG. 4B, the driver of the host vehicle visually finds the preceding vehicle. In FIG. 4C, the sensor of the host vehicle starts to detect the preceding vehicle. In FIG. 4D, the sensor of the host vehicle determines the presence of the preceding vehicle.

Soon after the driver of the host vehicle visually finds the preceding vehicle, the sensor of the host vehicle starts to detect the preceding vehicle. The inter-vehicle control device makes a judgment about determination of the presence of the preceding vehicle after a given required determination time elapses, in order to avoid a false recognition. However, in the case shown in FIGS. 4A to 4D, since the presence of the preceding vehicle is determined when the host vehicle comes rather close to the preceding vehicle, the driver needs to press on the brake. The driver, who has already found the preceding vehicle, expects that the inter-vehicle control device is activated to perform an automatic deceleration operation, but the deceleration operation is not performed, disappointing the driver for a moment.

Figure 15A:
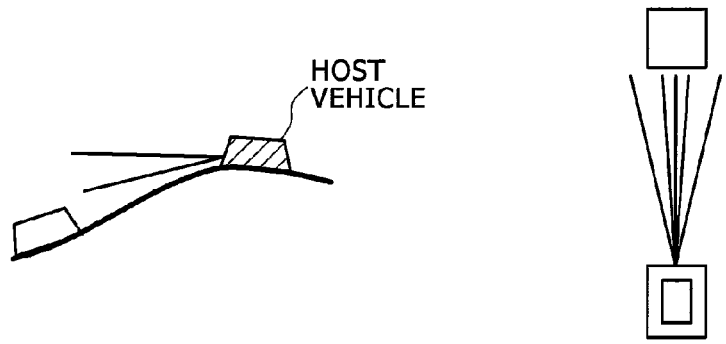
FIGS. 15A to 15C illustrate an example of detection (in a gradient) using a laser radar.
Figure 15B:
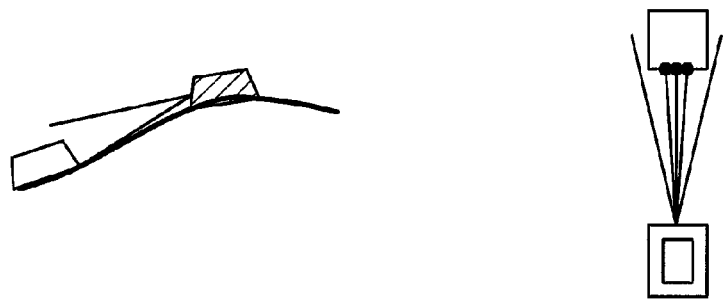
Figure 15C:
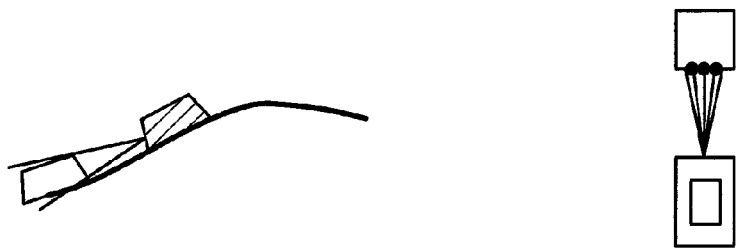
Figure 16A:
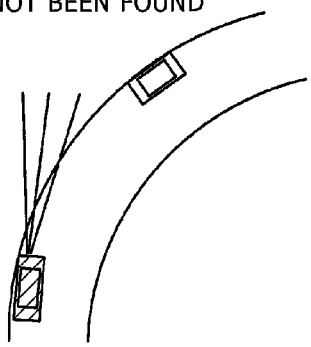
FIGS. 16A to 16E illustrate an example of detection (in a curve) using the laser radar.
Figure 16B:
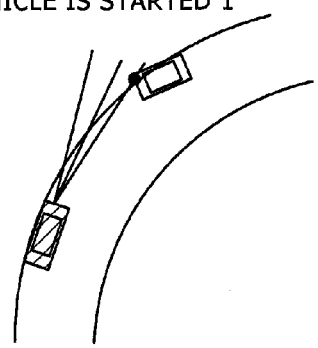
Figure 16C:
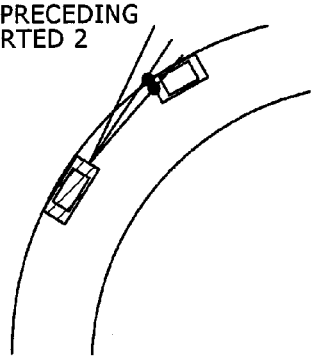
Figure 16D:
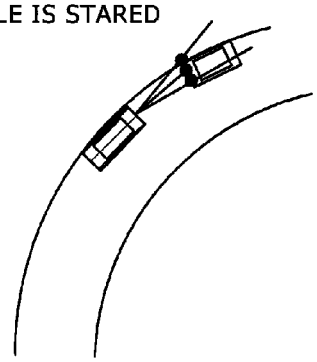
Figure 16E:
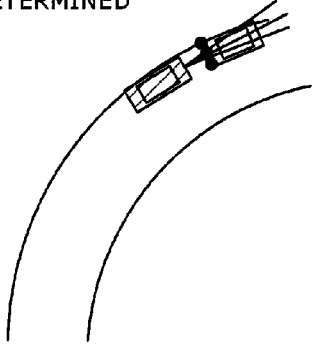

FIGS. 15A to 15C illustrate an example of detection in a gradient using a laser radar.

When a preceding vehicle suddenly appears in a lower part of the gradient as shown in FIG. 15B, three points at the center, right, and left parts on the rear of the preceding vehicle are detected by the laser radar to start a preceding vehicle determination process. After a required determination time elapses, the detection of the preceding vehicle is determined.

Figure 18:
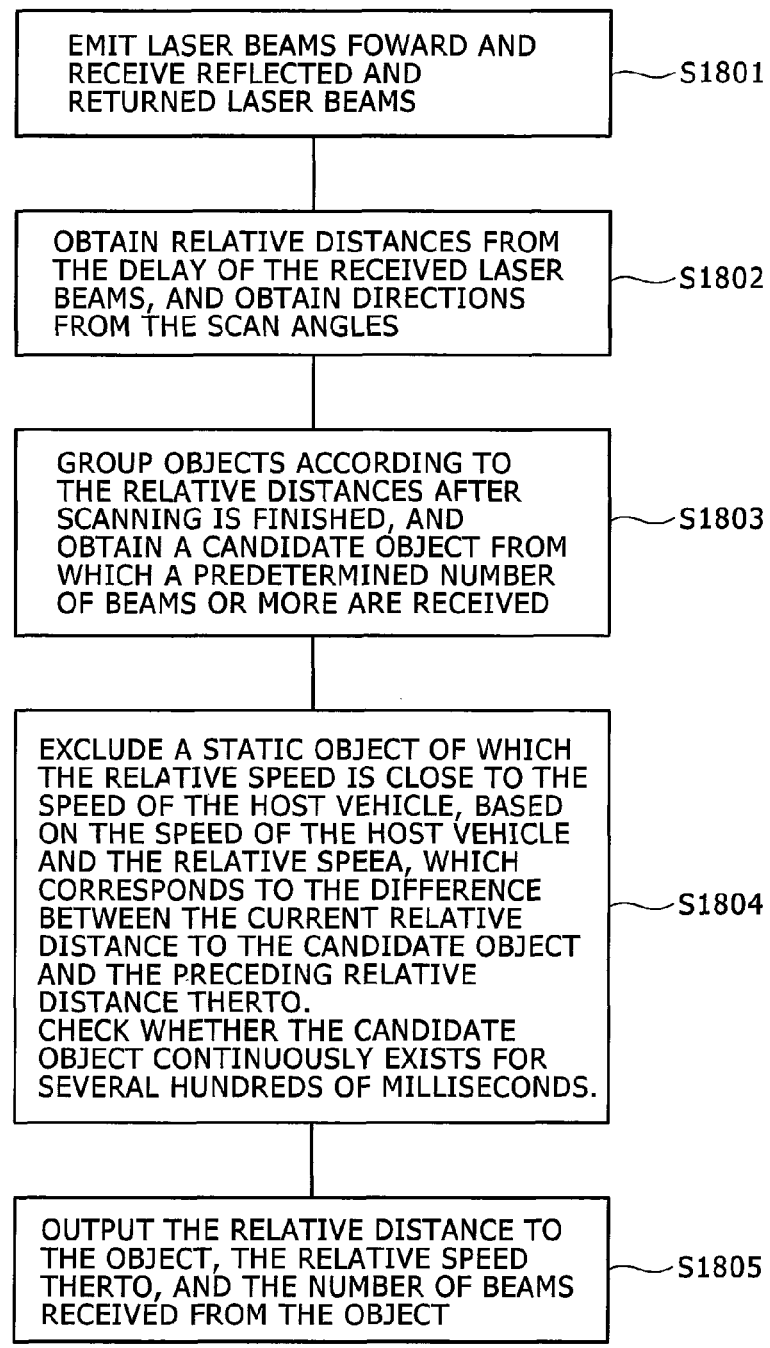
FIG. 18 shows an example of a recognition process using the laser radar.

An outline of a recognition process using the laser radar will be described with reference to FIG. 18. In S1801, laser beams are emitted forward and reflected and returned laser beams are received. In S1802, relative distances are obtained from the time delay of the received laser beams, and directions are obtained from the scan angles. In S1803, objects are grouped according to the relative distances after scanning is finished, to obtain a candidate object from which a predetermined number of beams or more are received. In S1804, based on the speed of the host vehicle and the relative speed, which corresponds to the difference between the current relative distance to the candidate object and the preceding relative distance thereto, a static object of which the relative speed is close to the speed of the host vehicle is excluded. It is checked whether the candidate object continuously exists for several hundreds of milliseconds. In S1805, the relative distance to the object, the relative speed thereto, and the number of beams received from the object are output.

Figure 5:
FIG. 5 illustrates a case where the host vehicle passes through the vicinity of the bottom of a gradient and suddenly finds a preceding vehicle.

FIG. 5 illustrates a case where the host vehicle passes through the vicinity of the bottom of a gradient and suddenly finds a preceding vehicle. As in the case where the host vehicle passes through the vicinity of the top of a gradient, the sensor of the host vehicle determines the presence of the preceding vehicle when the host vehicle comes rather close to the preceding vehicle.

Figure 6:
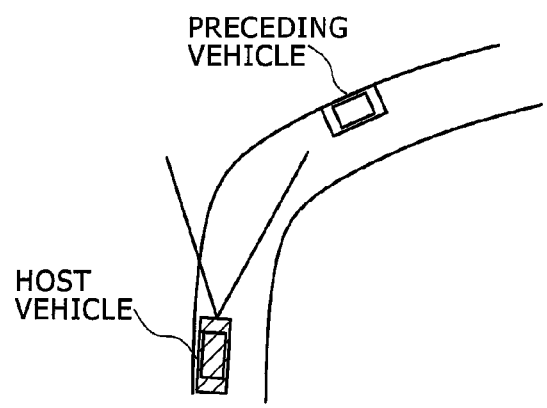
FIG. 6 illustrates a case where the host vehicle passes through the vicinity of a curve and suddenly finds a preceding vehicle.

FIG. 6 illustrates a case where the host vehicle passes through the vicinity of a curve and suddenly finds a preceding vehicle. If the preceding vehicle is suddenly recognized beyond the curve, the sensor requires time to determine the presence of the preceding vehicle also in this case.

FIGS. 16A to 16E illustrate an example of detection in a right-hand curve using the laser radar. When a preceding vehicle is found in the right-hand curve, the preceding vehicle is sequentially detected in order of the right part on the rear of the preceding vehicle, the right and center parts thereon, and the right, center, and left parts thereon. The preceding vehicle determination process is started when the three points at the right, center, and left parts on the rear of the preceding vehicle are detected. After the required determination time elapses, the preceding vehicle is determined.

Figure 7:
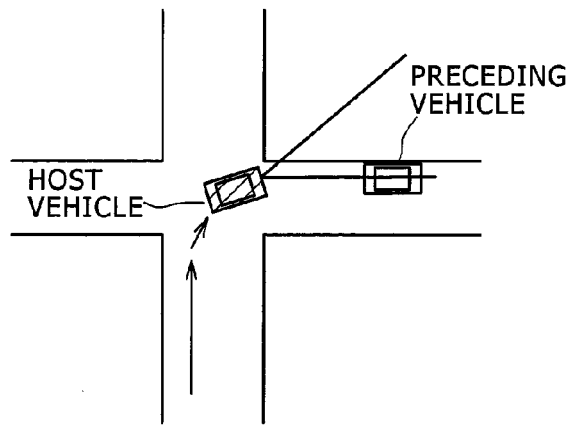
FIG. 7 illustrates a case where the host vehicle suddenly finds a preceding vehicle beyond an intersection.

FIG. 7 illustrates a case where a preceding vehicle is suddenly found beyond an intersection. When the host vehicle changes its direction and finds the preceding vehicle, the sensor requires time to determine the presence of the preceding vehicle also in this case.

As described above with reference to FIGS. 4A to 4D and FIGS. 5 to 7, in order to determine the preceding vehicle and to activate an actuator, it is necessary for the laser radar to detect the three points at the right, center, and left parts on the rear of the preceding vehicle and to monitor the detection state during the required determination time.

Next, a method of reducing the required determination time, according to this embodiment will be described with reference to FIG. 8 and subsequent drawings.

Figure 8:
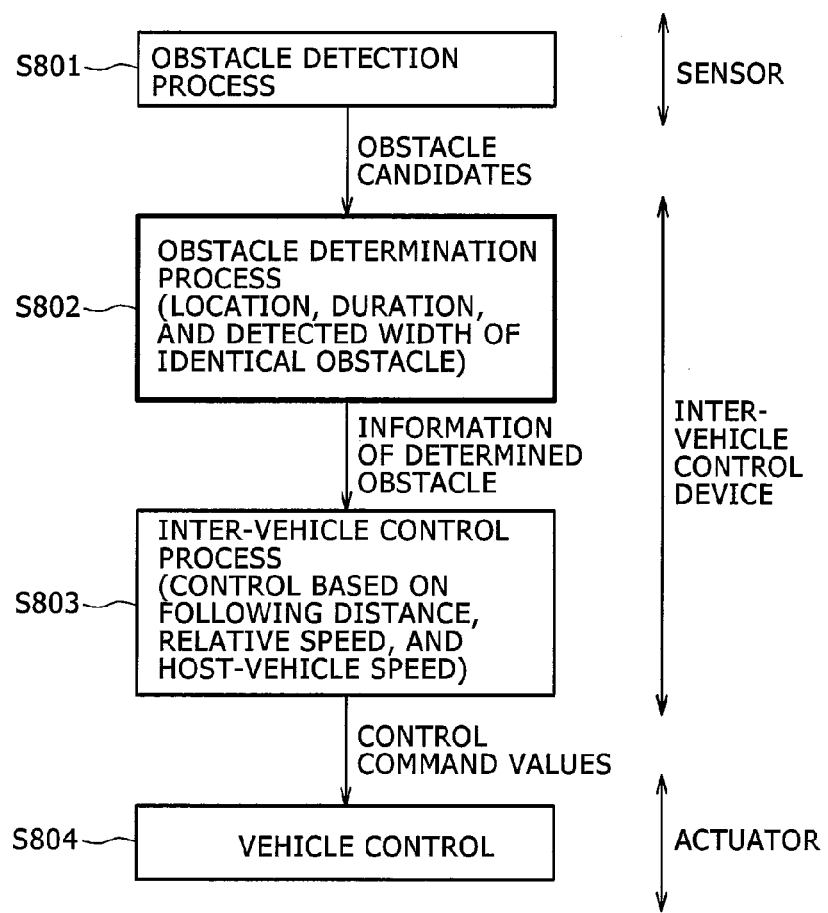
FIG. 8 is a process flow from sensor detection to vehicle control.

FIG. 8 is a process flow from sensor detection to vehicle control.

In S801, the sensor 201 detects obstacles and outputs data of an obstacle candidate. In S802, an obstacle determination process is performed. In the obstacle determination process, the obstacle is determined based on duration in which the obstacle is being detected. Information of the obstacle, determined through the obstacle determination process, is output. In S803, based on the host vehicle speed and the distance and relative speed to the determined obstacle, the inter-vehicle control device 203 outputs control command values to control the vehicle, such as a torque value, a brake oil pressure value, and a transmission command value. In S804, the inter-vehicle control device 203 activates an actuator to control the vehicle.

Figure 9A:
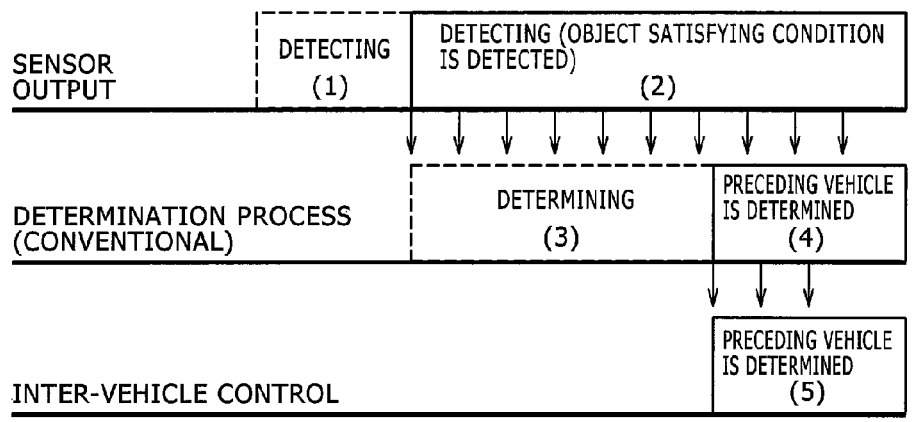
FIGS. 9A and 9B are timing charts of preceding vehicle detection.
Figure 9B:
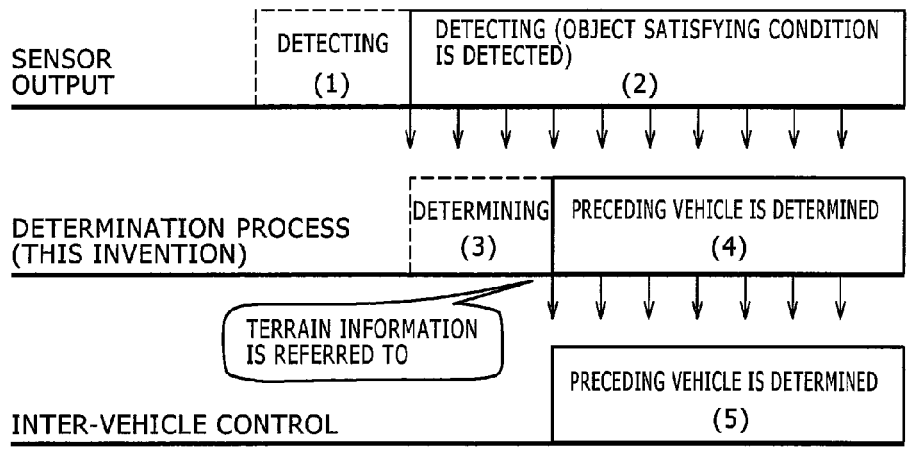

FIGS. 9A and 9B show timing charts of preceding vehicle detection. FIG. 9A shows a conventional detection process. FIG. 9B shows a detection process according to this embodiment.

In general, the sensor outputs information on a plurality of obstacles, and the inter-vehicle control section performs a preceding vehicle determination process based on the sensor information, and performs actual vehicle control based on the determination result.

In a sensor output process, when an object satisfying a condition is detected, the state of the detection process usually shifts from "detecting (1)" to "detecting (an object satisfying a condition is detected) (2)" in which a result is output.

In a conventional determination process, the state of the detection process shifts to "determining (3)" when information on the detected object is received from the sensor, and shifts to "preceding vehicle determination (4)" after the object is continuously recognized for the required determination time.

When the state of the detection process shifts to "preceding vehicle determination (4)", the inter-vehicle control section actuates the actuator.

A determination process of this embodiment is intended to reduce the duration of the state of "determining (3)". As a result, information on "preceding vehicle determination (4)" can be rapidly sent to the inter-vehicle control section 209.

In the case of using the laser radar, as shown in FIG. 17A, when the three points at the right, center, and left parts on the rear of the preceding vehicle have been detected, the determination process is started, and the preceding vehicle is determined after the required determination time elapses. With conventional techniques, the required determination time is set to about three to five seconds.

In this embodiment, as shown in FIG. 17B, the required determination time can be reduced by using terrain information. For example, the required determination time can be reduced to about 0.5 to 1 second. When the required determination time is reduced by about 2 seconds, the free running distance is 36.1 meters if the host vehicle is driven at a speed of 65 kilometers per hour, so that automatic deceleration can be started 36.1 meters short of the location where automatic deceleration is conventionally started. A time reduction in seconds is very important for vehicles driven at high speeds.

The course of a curve can be judged from a steering angle, a yaw rate, and map information of the position of the host vehicle. An obstacle may be determined, for example, by reducing the number of points on the obstacle to be detected using laser beams, without waiting for the obstacle to come completely in front of the host vehicle. For example, in a curve, an obstacle may be determined through detection of two points on the obstacle, such as the left and center parts or the right and center parts thereon.

Figure 19:
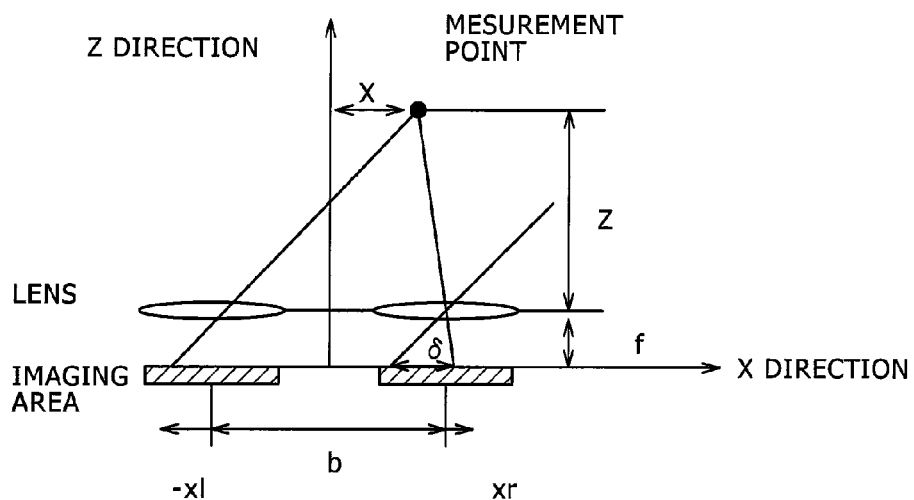
FIG. 19 shows the principle of a stereo camera.

Also in a case of using a stereo camera, the preceding vehicle determination process can be similarly performed. The stereo camera obtains the parallax between a right image and a left image to obtain the distance to a corresponding point from the parallax. FIG. 19 shows the principle of the stereo camera. The distance to an object and a lateral location of the object can be measured.

Figure 20:
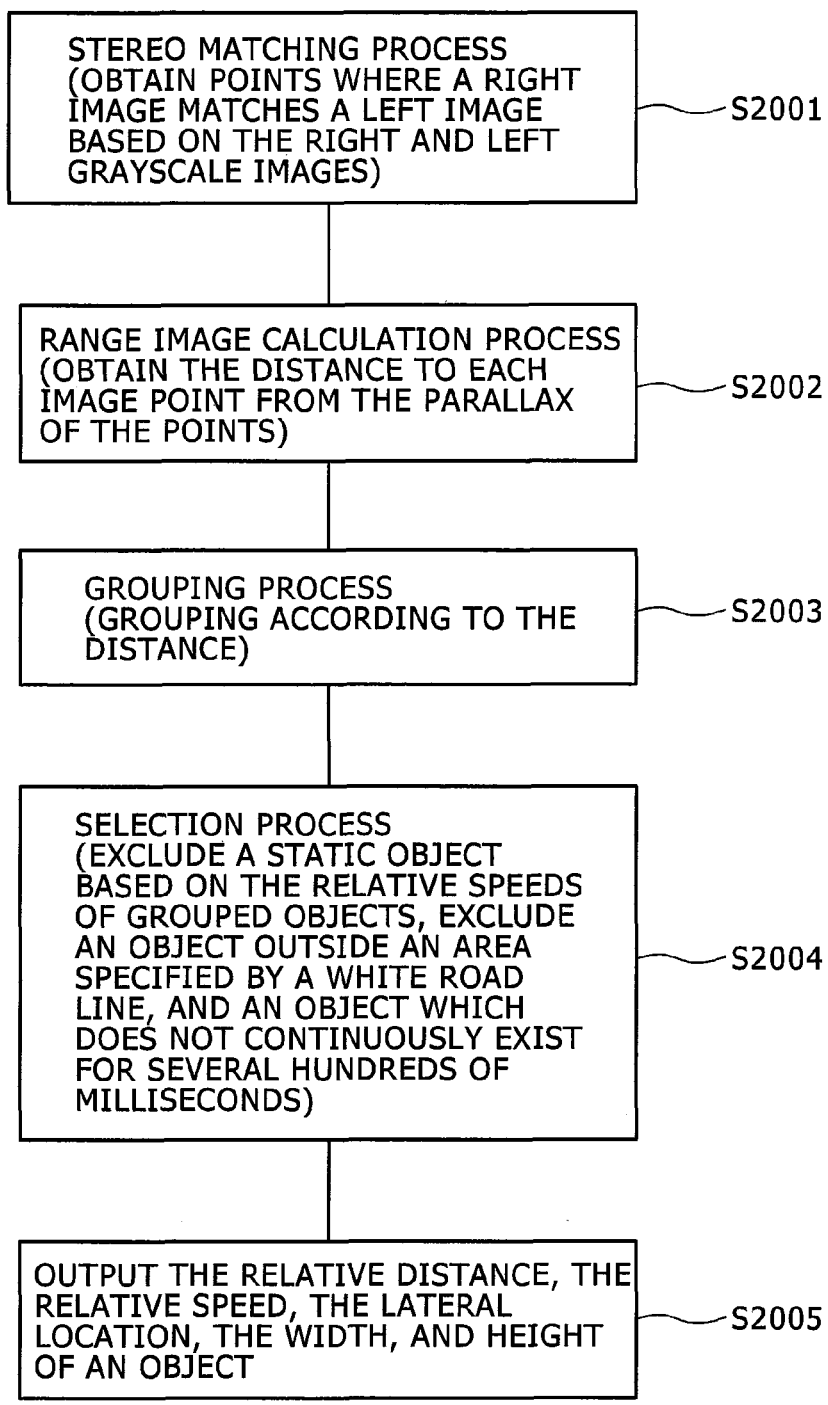
FIG. 20 shows an example of a recognition process using the stereo camera.

FIG. 20 shows an outline of a recognition process using the stereo camera. In S2001, a stereo matching process is performed to obtain points where a right image matches a left image based on the right and left grayscale images. In S2002, a range image calculation process is performed to obtain the distance to each image point from the parallax of the points. In S2003, a grouping process is performed according to the distance. Through the grouping process, the size and the lateral location of an object are recognized. In S2004, a selection process is performed to exclude a static object based on the relative speeds of grouped objects, or to exclude an object outside an area specified by a white road line if a white road line recognition function is provided. Further, an object which does not continuously exist for several hundreds of milliseconds is excluded. In S2005, the relative distance, the relative speed, the lateral location, the width, and the height of an object are output.

The object is continuously recognized and, when the required determination time elapses, the object is determined to be a preceding vehicle.

Even if the object does not exist in front of the host vehicle, when it is recognized, by using information on a curve, that the object exists in the course of the curve for the required determination time, the object may be determined to be a preceding vehicle. Further, when it is judged that the host vehicle is traveling in a gradient, a criterion of height for an object is made smaller and, after the object is recognized for the required determination time, the object may be determined to be a preceding vehicle.

In this embodiment, the preceding vehicle determination time can be reduced by using terrain information.

Figure 21:
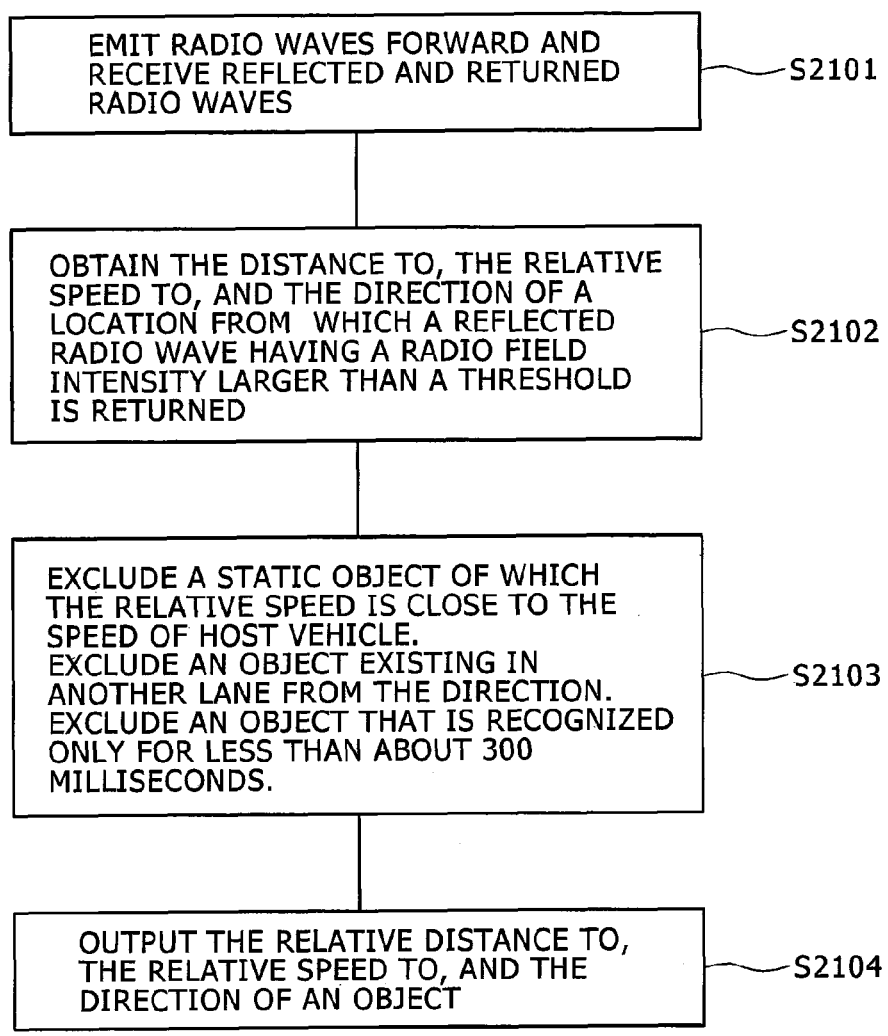
FIG. 21 shows an example of a recognition process using a millimeter wave radar.

Also in a case of using a millimeter wave radar, the preceding vehicle determination process can be similarly performed. FIG. 21 shows an example of a recognition process using the millimeter wave radar. In S2101, radio waves are emitted forward and reflected and returned radio waves are received. In S2102, the distance to, the relative speed to, and the direction of a location from which a reflected radio wave having a radio field intensity larger than a threshold is returned are obtained. It is possible to obtain the distance from the delay of a received radio wave, the relative speed from the Doppler frequency, and the direction from the scan angle.

In S2103, a static object of which the relative speed is close to the speed of host vehicle is excluded. An object existing in another lane is excluded from the obtained direction. An object that is recognized only for less than about 300 milliseconds is excluded. In S2104, the relative distance to, the relative speed to, and the direction of an object are output.

The object is continuously recognized, and, when the required determination time elapses, the object is determined to be a preceding vehicle. Even if the object does not exist in front of the host vehicle, when it is recognized, by using information indicating that the vehicle is traveling in a curve, that the object exists in the curve for the required determination time, the object can be determined to be a preceding vehicle.

In this embodiment, the required preceding vehicle determination time can be reduced by using terrain information.

FIG. 22 collectively shows example determination conditions used for respective sensors.

Figure 10:
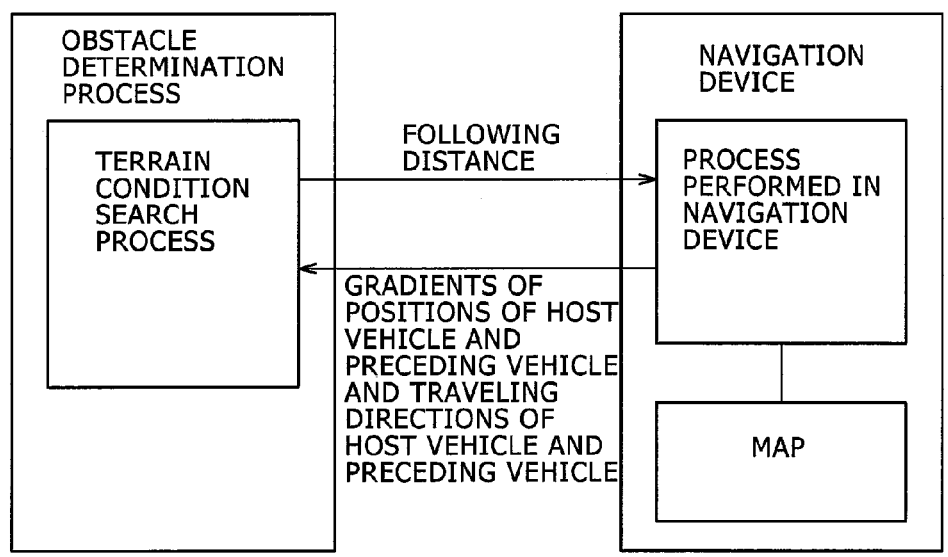
FIG. 10 shows data exchange between an obstacle determination process and a navigation device.

FIG. 10 shows data exchange between the obstacle determination process and the navigation device 202. Details of the obstacle determination process will be described below. The obstacle determination process sends information on the following distance, to the navigation device 202, and receives, from the navigation device 202, information on the gradients of the positions of the host vehicle and the preceding vehicle and information on the traveling directions of the host vehicle and the preceding vehicle.

Figure 11:
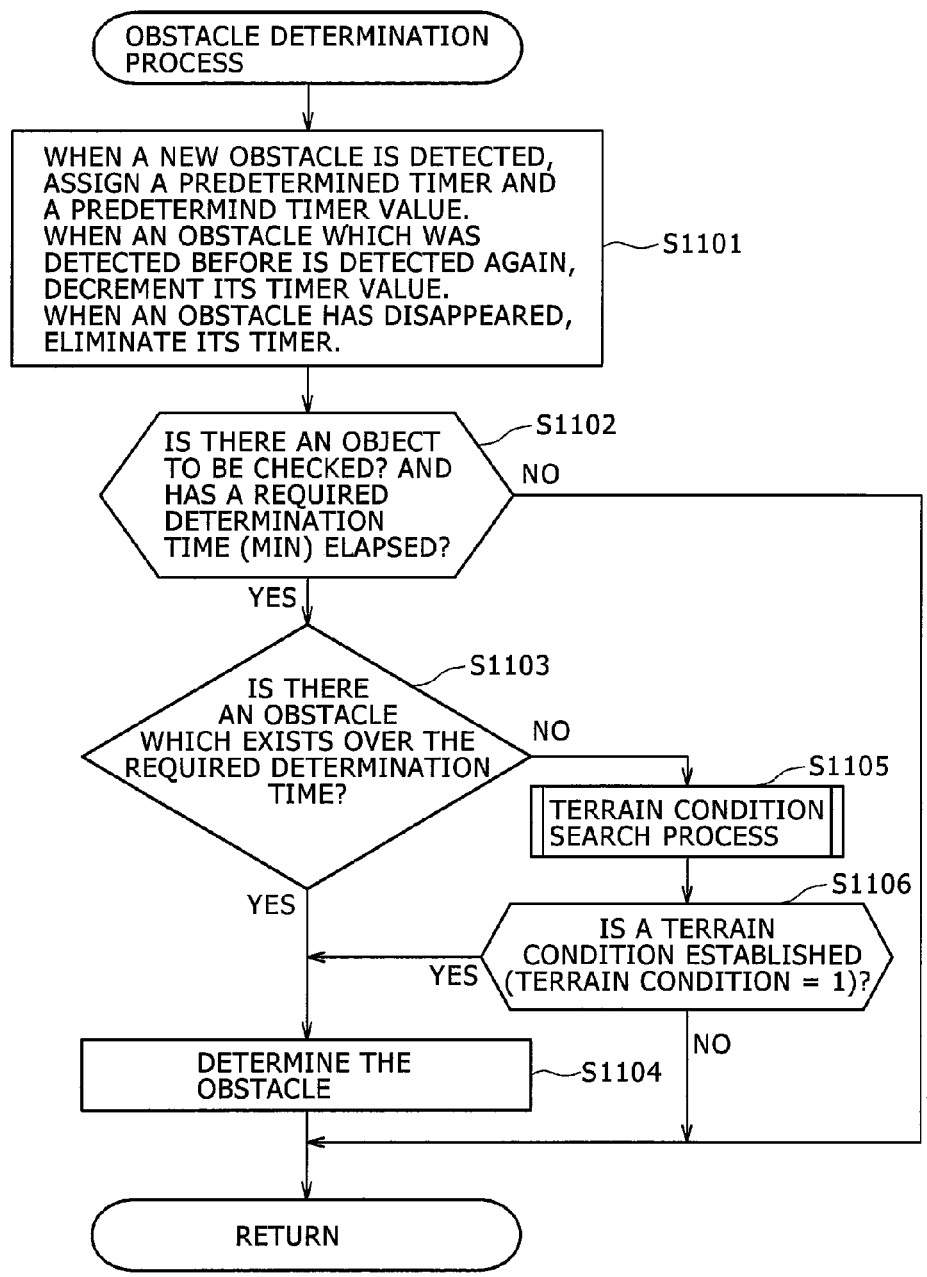
FIG. 11 shows the obstacle determination process.
Figure 12:
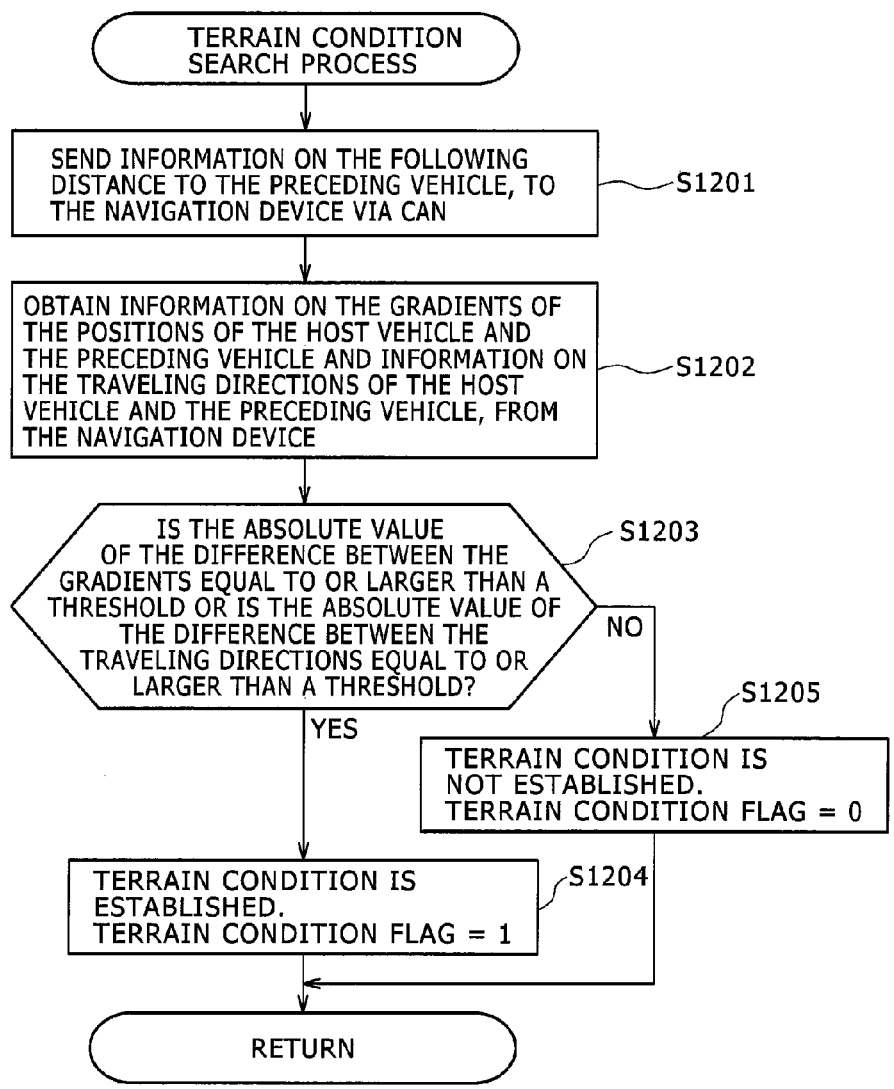
FIG. 12 shows a terrain condition search process.

FIG. 11 shows a flowchart of the obstacle determination process. Details of a method of implementing the obstacle determination process will be described. The obstacle determination process is usually called to be executed at intervals of 10 milliseconds, for example. In S1101, data is obtained from the sensor and checked. When a new obstacle is detected, a predetermined timer and a predetermined timer value are assigned. When an obstacle which was detected before is detected again, its timer value is decremented. Further, when an obstacle has disappeared or has shifted from the front of the host vehicle, the corresponding timer is eliminated. When there is an obstacle to be checked and a minimum required determination time (MIN) has elapsed, the judgment in S1102 is Yes, the process flow advances to S1103 to make another judgment. When the judgment in S1102 is No, the process flow returns. In S1103, it is judged from the timer value whether there is an obstacle which exists over the required determination time. If the judgment in S1103 is Yes, the process flow advances to S1104 to determine the obstacle. If the judgment in S1103 is No, the process flow advances to S1105 to perform a terrain condition search process (details thereof are shown in FIG. 12). After the terrain condition search process of S1105, the process flow advances to S1106 to perform a terrain condition judgment process. If a terrain condition is established (Yes) in S1106, the process flow advances to S1104 to perform the obstacle determination process. If the terrain condition is not established (No) in S1106, the process flow returns.

In this embodiment, the terrain condition search process of S1105 and the judgment process of S1106 are added, so that there is no need to always wait for the required determination time to elapse and, when the terrain condition is established, the obstacle is determined immediately.

FIG. 12 is a flowchart of the terrain condition search process. In S1201, information on the following distance to the preceding vehicle is sent to the navigation device 202 via the CAN. Next, in S1202, information on the gradients of the positions of the host vehicle and the preceding vehicle and information on the traveling directions of the host vehicle and the preceding vehicle are obtained from the navigation device 202. When the absolute value of the difference between the gradients is equal to or larger than a threshold or when the absolute value of the difference between the traveling directions is equal to or larger than a threshold, the terrain condition is established (Yes) in the judgment of S1203, and the process flow advances to S1204 to perform a terrain condition flag setting process. When the terrain condition is not established (No) in S1203, the process flow advances to S1205 to perform a terrain condition flag clear process.

FIGS. 13A and 13B illustrate how to obtain the gradient differences and the traveling-direction differences. As shown in FIG. 13A, each gradient difference is obtained from the difference between the gradients of the positions of the host vehicle and the preceding vehicle.

FIG. 13B shows how to obtain the traveling-direction difference in a curve and in an intersection. The traveling direction of the host vehicle is obtained from map information of the position of the host vehicle or gyro information of the navigation device 202. The traveling direction of the preceding vehicle is obtained from map information of the position of the preceding vehicle. Therefore, the traveling-direction difference is obtained from the difference between the traveling direction of the host vehicle and the traveling direction of the preceding vehicle.

Instead of the above-mentioned method, another method can be used in which the traveling direction difference is obtained from the radius of curvature of a curve and the following distance. A calculation method is shown in a formula 3.

Traveling-direction difference=2×arcsin((Following distance/2)/Radius of curvature)     Formula 3

When the preceding vehicle exists beyond an intersection, the traveling-direction difference can be obtained from the traveling direction of the preceding vehicle and the traveling direction of the host vehicle, obtained using a gyro or the like.

Figure 14:
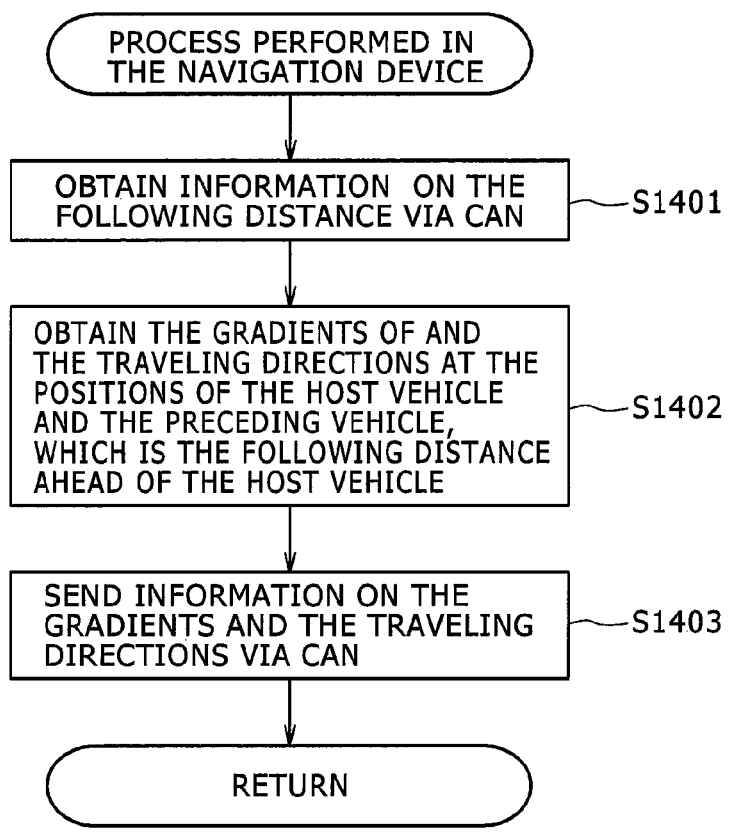
FIG. 14 shows a process performed in the navigation device.

FIG. 14 shows a process performed in the navigation device 202. In S1401, information on the following distance is obtained via the CAN. In S1402, the gradients of and the traveling directions (traveling directions of north, south, east, and west) at the positions of the host vehicle and the preceding vehicle, which is the following distance ahead of the host vehicle, are obtained. In S1403, information on the obtained gradients and traveling directions are sent via the CAN.

The obstacle determination process has been described in detail with reference to FIGS. 11 to 14.

As described above, the required determination time for an obstacle can be reduced by using the terrain condition concerning a gradient or a curve obtained in the navigation device 202.

In the data exchange between the obstacle determination process and the navigation device 202, shown in FIG. 10, the obstacle determination process sends information on the following distance to the navigation device 202, obtains information on the gradients and the traveling directions from the navigation device 202, and sets the terrain condition flags. However, in this embodiment, data exchange between the obstacle determination process and the navigation device 202 can be implemented not only by the way shown in FIG. 10 but also by two example ways to be described below.

First, an example of setting a terrain condition flag in the navigation device 202 will be described with reference to FIG. 23 and other figures.

Figure 23:
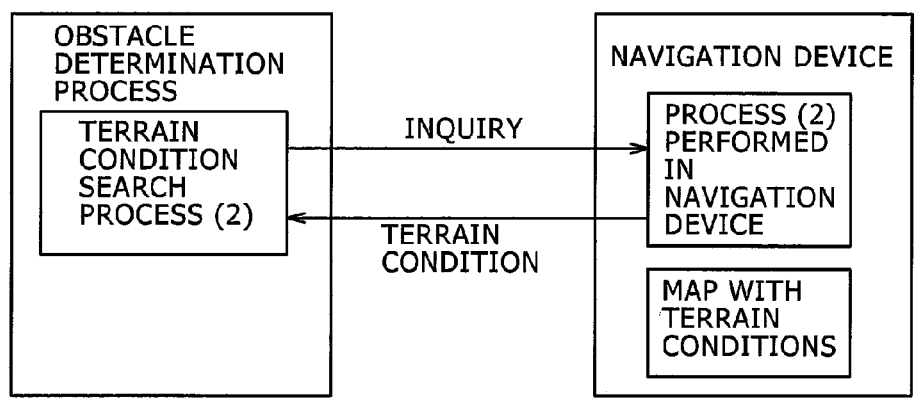
FIG. 23 shows another data exchange (2) between the obstacle determination process and the navigation device.

FIG. 23 shows another data exchange (2) between the obstacle determination process and the navigation device 202. The obstacle determination process inquires a terrain condition of the navigation device 202, and obtains the terrain condition from the navigation device 202. The navigation device 202 has an electronic map with terrain conditions.

An obstacle determination process is the same as that shown in FIG. 11, so a description thereof is omitted.

Figure 24:
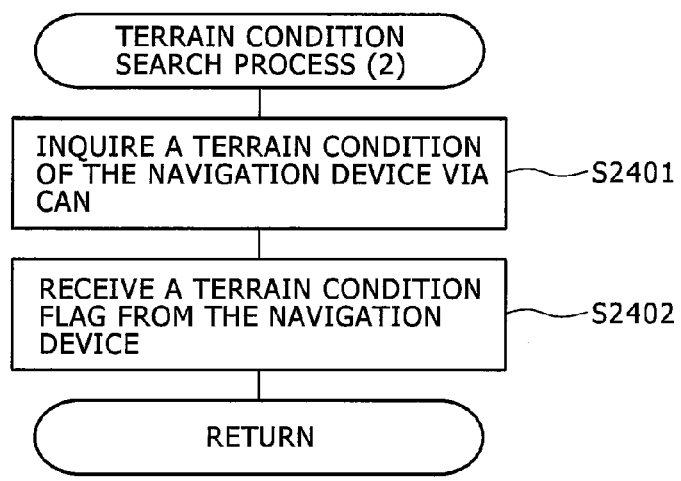
FIG. 24 shows another terrain condition search process (2).

FIG. 24 shows another terrain condition search process (2). In S2401, the obstacle determination section 208 inquires a terrain condition of the navigation device 202 via the CAN. In S2402, a terrain condition flag is received from the navigation device 202.

Figure 25:
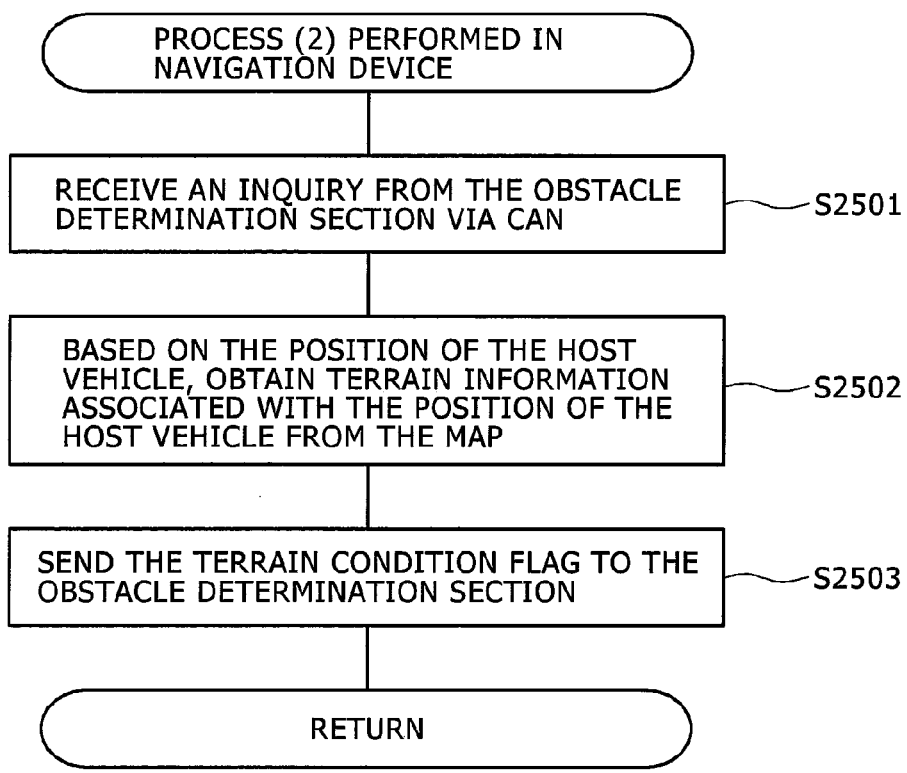
FIG. 25 shows another process (2) performed in the navigation device.

FIG. 25 shows another process (2) performed in the navigation device 202. In S2501, an inquiry is received from the obstacle determination section 208 via the CAN. In S2502, based on the position of the host vehicle, terrain information associated with the position of the host vehicle is obtained from the map. In S2503, the setting of the terrain condition flag is sent to the obstacle determination section 208.

FIG. 26 shows a method of generating a map having terrain conditions. In S2601, information on the gradient and the traveling direction at each location on a road map are specified such that the information can be retrieved. In S2602, the gradient difference and the traveling-direction difference between a predetermined location (1) and a location (2) which is a sensor-detection distance away from the predetermined location (1) are obtained. When one of or both of the gradient difference and the traveling-direction difference are larger than respective thresholds, the terrain condition flag of the predetermined location (1) is set on in S2603. In S2604, the predetermined location (1) is associated with the terrain condition flag on map data. In S2605, such map data is generated for the entire map by specifying locations at intervals of five meters, for example, to set the terrain condition flags there.

Since the locations are specified at intervals of the sensor-detection distance, changes in terrain tend to occur. Therefore, the required determination time (MIN) may be set slightly longer.

In the data exchange (2) between the obstacle determination process and the navigation device 202, shown in FIG. 23, a special map is used such that the terrain condition flag can be set in the navigation device 202.

Figure 27:
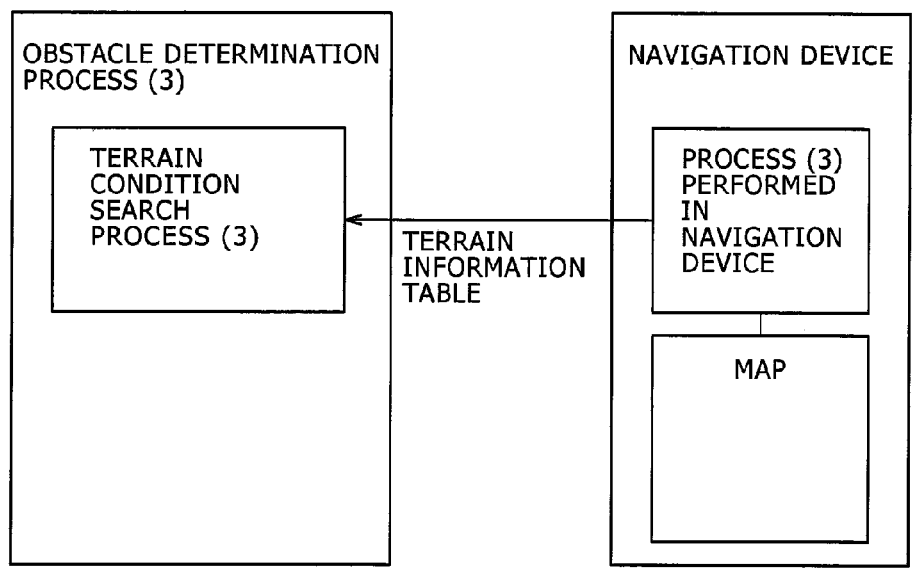
FIG. 27 shows still another data exchange (3) between the obstacle determination process and the navigation device.

Next, with reference to FIG. 27 and other figures, an example case where the obstacle determination section 208 obtains a terrain information table for traveling directions, from the navigation device 202 in advance, and the terrain condition flags are set according to information of the terrain information table.

FIG. 27 shows still another data exchange (3) between the obstacle determination process and the navigation device 202. The navigation device 202 sends the terrain information table to the obstacle determination section 208 through still another process (3) performed in the navigation device 202.

Figure 31:
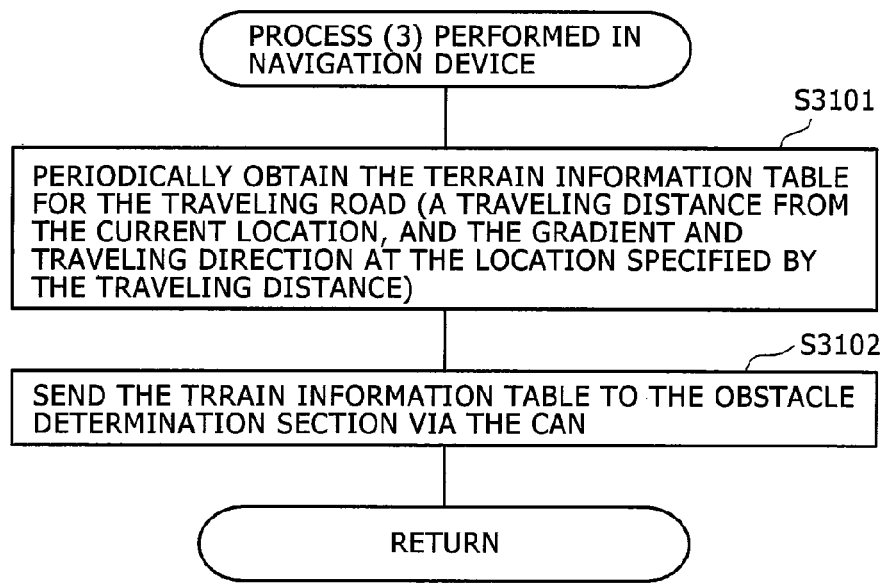
FIG. 31 shows still another process (3) performed in the navigation device.

As shown in a lower part of FIG. 31, the terrain information table includes each distance, and the gradient and traveling direction at the location specified by the distance.

Figure 28:
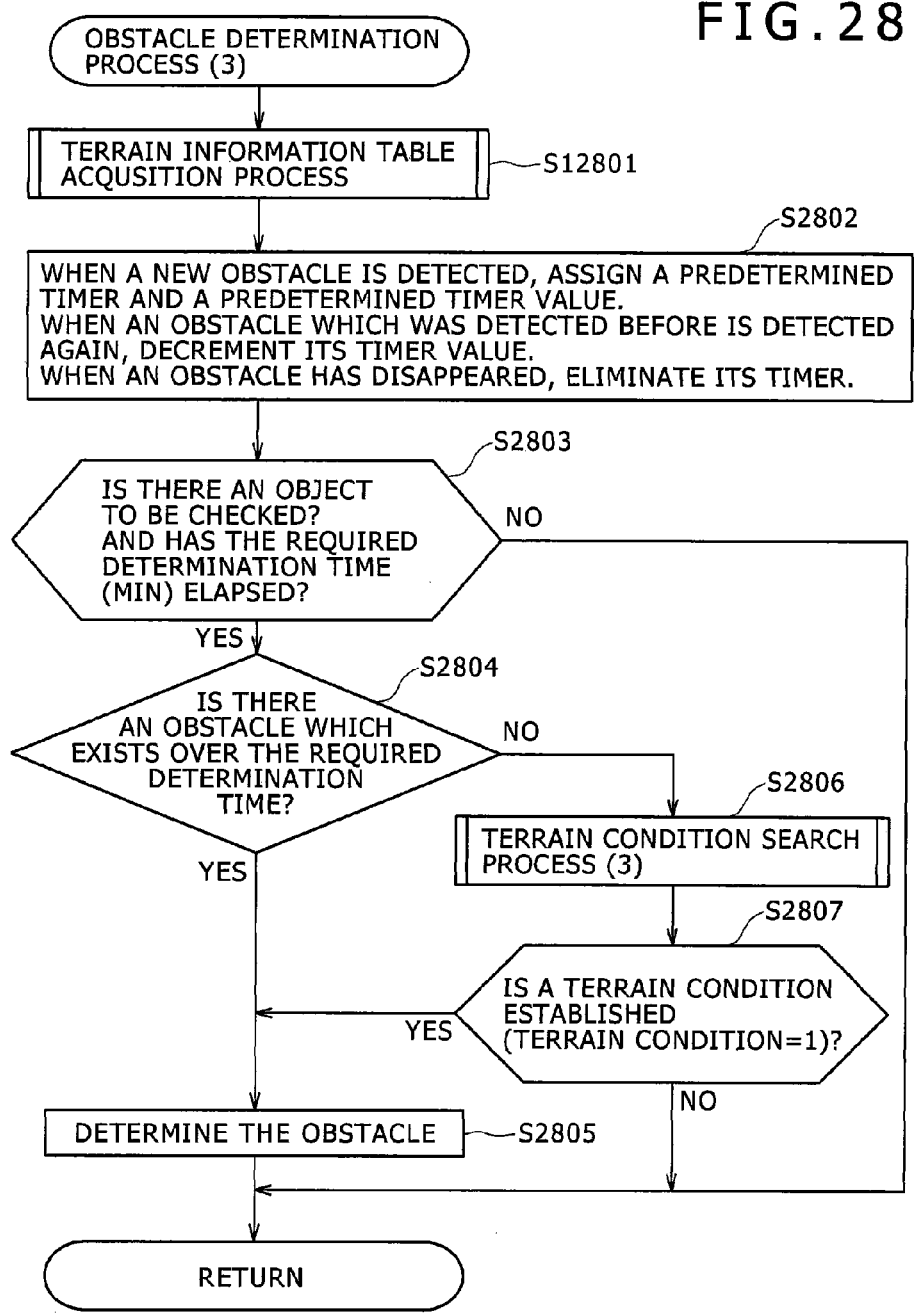
FIG. 28 shows still another obstacle determination process (3).

FIG. 28 shows still another obstacle determination process (3). The obstacle determination process (3) of FIG. 28 is different from the obstacle determination process of FIG. 11 in that a terrain information table acquisition process in S2801 is added and still another terrain condition search process (3) in S2806 is used.

Figure 29:
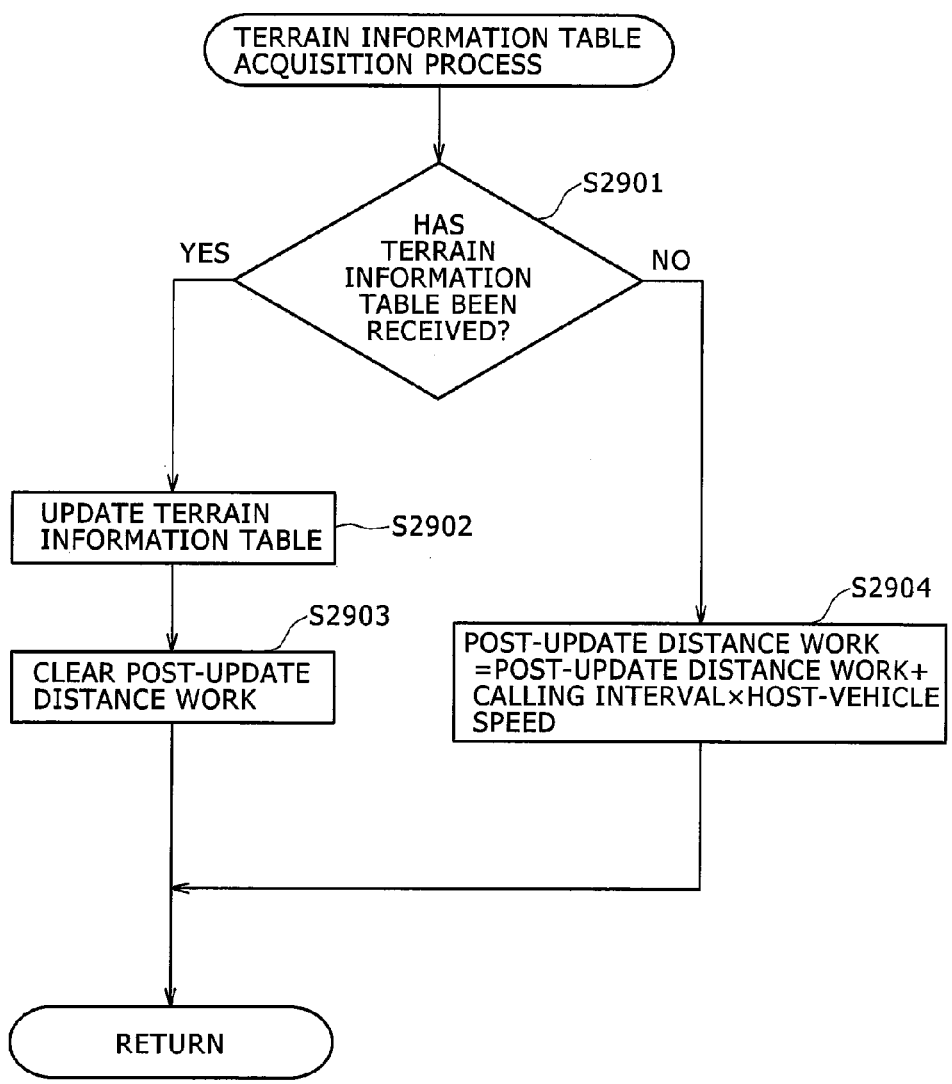
FIG. 29 shows a terrain information table acquisition process.

FIG. 29 shows the terrain information table acquisition process. In S2901, it is judged whether the terrain information table has been received from the navigation device 202. When the judgment in S2901 is Yes, the terrain information table is updated in S2902 and a post-update distance work for obtaining a running distance after the terrain information table is updated is cleared in S2903. When the judgment in S2901 is No, the value of the post-update distance work is updated based on the speed of the host vehicle and the calling interval of the terrain information table acquisition process, in S2904.

Figure 30:
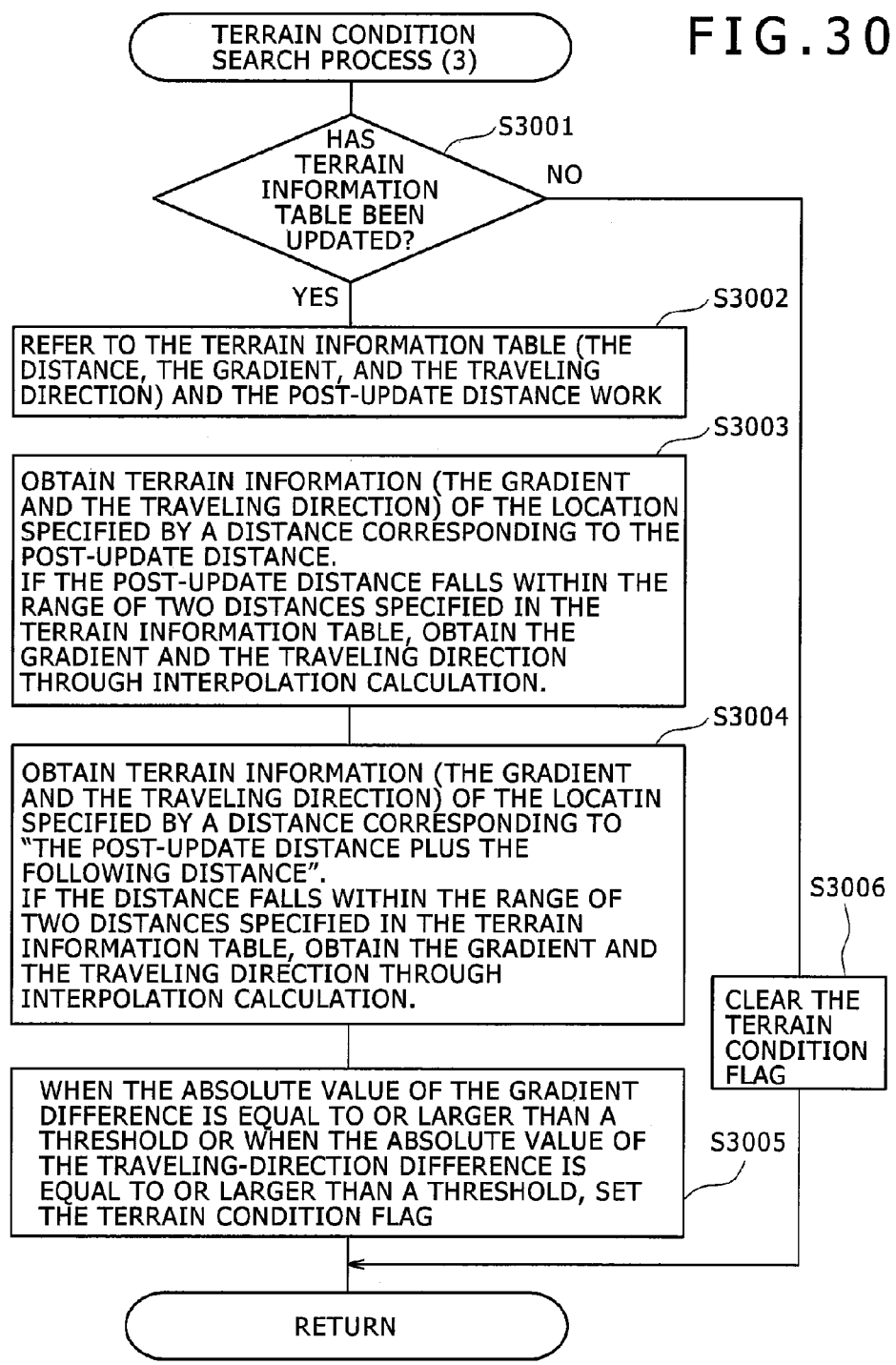
FIG. 30 shows still another terrain condition search process (3).

FIG. 30 shows still another terrain condition search process (3). In S3001, it is judged whether the terrain information table has been updated. When the judgment in S3001 is Yes, the process flow advances to S3002. When the judgment in S3001 is No, which means that the terrain information table has not been updated or is not used, so the terrain condition flag is cleared in S3006 and the process flow returns. In S3002, the terrain information table (the distance, the gradient, and the traveling direction) and the post-update distance work are referred to.

In S3003, terrain information (the gradient and the traveling direction) of the location specified by a distance corresponding to the post-update distance is obtained. If the post-update distance falls within the range of two distances specified in the terrain information table, the gradient and the traveling direction are obtained through interpolation calculation. In S3004, terrain information (the gradient and the traveling direction) of the location specified by a distance corresponding to "the post-update distance plus the following distance" is obtained. If the distance falls within the range of two distances specified in the terrain information table, the gradient and the traveling direction are obtained through interpolation calculation.

In S3005, the gradient difference is obtained from the above-mentioned two gradients and the traveling-direction difference is obtained from the above-mentioned two traveling directions. When the absolute value of the gradient difference is equal to or larger than a threshold or when the absolute value of the traveling-direction difference is equal to or larger than a threshold, the terrain condition flag is set.

FIG. 31 shows the process (3) performed in the navigation device 202. In S3101, the terrain information table for the traveling road (a traveling distance from the current location, and the gradient and traveling direction at the location specified by the traveling distance) is periodically obtained. In S3102, the terrain information table is sent to the obstacle determination section 208 via the CAN.

With reference to FIG. 27 and other figures, the example case has been described above, in which the obstacle determination section 208 obtains the terrain information table for the traveling directions, from the navigation device 202 in advance, and the terrain condition flags are set according to information of the terrain information table.

The two example ways of data exchange between the obstacle determination process and the navigation device 202 have been additionally described above.

Each of the determination conditions shown in FIG. 22 can be specified in the obstacle determination section 208 through the navigation device 202 or another input means. Specifically, a minimum required determination time, a required determination time, a detection method used in a curve, and a detection method used in a gradient can be specified.

ACC control is realized by the process of the inter-vehicle control section 209. In the ACC control, constant-speed control is performed when there is no preceding vehicle, and tracking control (feedback control of the following distance and the relative speed) is performed when there is a preceding vehicle. The inter-vehicle control section 209 can perform pre-crash damage reduction control at the same time. The pre-crash damage reduction control is used to perform brake control when a crash cannot be avoided and is activated when the time to collision with a preceding vehicle is 0.8 seconds or below.

Further, the inter-vehicle control section 209 can perform alarming, preliminary deceleration, and deceleration as shown in FIG. 32. Specifically, the inter-vehicle control section 209 can obtain the time to collision (TTC) with the preceding vehicle, judges the value of the TTC, and perform the alarming, the preliminary deceleration, and the deceleration. Further, the inter-vehicle control section 209 can change the deceleration applied by the brake depending on the value of the TTC.

The TTC can be obtained by a formula 4 or by a formula 5 in which acceleration is taken into account. The acceleration can be obtained by differentiating the hourly-measured host vehicle speed with respect to the preceding vehicle speed (=host vehicle speed plus relative speed).

$$TTC = \text{relative distance to the preceding vehicle/relative speed thereto} \quad \text{Formula 4}$$

$$\text{Relative distance} + \text{preceding vehicle speed} \times TTC + 0.5 \times \text{preceding vehicle acceleration} \times TTC \times TTC = \text{host vehicle speed} \times TTC + 0.5 \times \text{host vehicle acceleration} \times TTC \times TTC \quad \text{Formula 5}$$

According to this embodiment, the obstacle determination time is reduced by the terrain condition, so that the activation operation of the inter-vehicle control section 209 can be performed earlier to avoid a sudden recognition of a short following distance.

The first embodiment can be implemented as described above. In the first embodiment, the effect can be recognized in driving at a gradient or at a curve. When a vehicle is driven in the same manner while a part of the function of the navigation device 202 is limited, for example, by blocking a GPS antenna, a difference in effect can be recognized and implementation of the present invention can be checked.

FIG. 3 shows an obstacle recognition device according to a second embodiment of the present invention, which includes the sensor 201 that obtains the following distance and relative speed to a preceding vehicle, the navigation device 202 that obtains terrain information of the positions of the host vehicle and the preceding vehicle, and the communication cable 206 that connects the above-mentioned devices. The CAN is used for communications performed between the above-mentioned devices via the communication cable 206. The sensor 201 includes the obstacle detection section 207 that performs an input process in the sensor 201, and the obstacle determination section 208 that determines recognition of an obstacle. The sensor 201 sends an obstacle recognition and determination result to the inter-vehicle control device 203 via the CAN.

Instead of the CAN, a dedicated communication cable may be used to exchange data between the navigation device 202 and the sensor 201.

Control processing according to this embodiment is realized by software processing, and the software is stored in the sensor 201 or the navigation device 202.

FIG. 33 is another process flow (2) from sensor detection to vehicle control. The process flow (2) of FIG. 33 is different from the process flow of FIG. 8 in that the obstacle determination process is implemented by the sensor 201 instead of the inter-vehicle control device 203.

The required determination time for an obstacle can be reduced by using the terrain condition concerning a gradient or a curve, obtained in the navigation device 202, so that information about the obstacle can be rapidly sent to the inter-vehicle control device 203. With the use of an input section provided for the navigation device 202, the required determination time can be set or changed due to terrain, by instructions.

The obstacle recognition device can output, in addition to conventional information about a number of obstacle candidates, determined-obstacle information obtained by using the terrain condition, which is a feature of this embodiment.

It is assumed that the obstacle recognition device can be implemented by using a laser radar, a stereo camera, or a millimeter wave radar. Since details of their processing are the same as those described in the first embodiment, descriptions thereof are omitted.

In the obstacle recognition device, not only the laser radar, the stereo camera, and the millimeter wave radar but also any sensor which can obtain the relative distance and relative speed to a preceding vehicle can be used. Further, it is also possible to use a sensor of which the detection angle can be changed (vertically and horizontally) by using information on the gradient of the position of the host vehicle and information on a steering angle, by a known technique.

The second embodiment can be implemented as described above.

What is claimed is:

1. A vehicle control device, comprising:
    a sensor-information input section that receives information from a sensor which detects an obstacle;
    a terrain-information input section that receives terrain information of the position of a host vehicle from a map database;
    an obstacle determination process section that determines whether or not an obstacle is continuously detected until a given period of time elapses after the sensor detects the obstacle, and that determines that the obstacle is a preceding vehicle when the obstacle is continuously detected over the given period of time but that changes obstacle determination processing to determine that the obstacle is a preceding vehicle when the obstacle is not continuously detected over the given period of time in order to perform a terrain search process based on the terrain information of the position of the host vehicle received from the terrain-information input section, eliminate a need to always wait for the given period of time to elapse, and shorten a time to automatic deceleration.

2. A vehicle control device according to claim 1, wherein the terrain information of the position of the host vehicle, received from the terrain-information input section, indicates that the host vehicle is located in a vicinity of a gradient road.

3. A vehicle control device according to claim 1, wherein the terrain information of the position of the host vehicle, received from the terrain-information input section, indicates that the host vehicle is located in a vicinity of a curve.

4. A vehicle control device according to claim 1, wherein the terrain information of the position of the host vehicle, received from the terrain-information input section, indicates that the host vehicle is located in a vicinity of an intersection.

5. A vehicle control device according to claim 1, further comprising a following distance control section that controls, based on a following distance to and a relative speed to the preceding vehicle determined by the obstacle determination process section, the following distance to the preceding vehicle.

6. A vehicle control device according to claim 1, wherein the map database is implemented by a navigation device.

7. A vehicle control method, comprising:
    receiving information at a sensor-information input section from a sensor which detects an obstacle;
    receiving terrain information of the position of a host vehicle at a terrain information input section from a map database; and,
    determining, at an obstacle determination process section, whether or not an obstacle is continuously detected until a given period of time elapses after the sensor detects the obstacle;
    determining, at the obstacle determination process section, that the obstacle is a preceding vehicle when the obstacle is continuously detected over the given period of time; and
    changing, at the obstacle determination process section, obstacle determination processing when the obstacle is not continuously detected over the given period of time in order to perform a terrain search process based on the terrain information of the position of the host vehicle received from the terrain-information input section, eliminate a need to always wait for the given period of time to elapse, and shorten a time to automatic deceleration.

8. A vehicle control method according to claim 7, wherein the received terrain information of the position of the host vehicle indicates that the host vehicle is located in a vicinity of a gradient road.

9. A vehicle control method according to claim 7, wherein the received terrain information of the position of the host vehicle indicates that the host vehicle is located in a vicinity of a curve.

10. A vehicle control method according to claim 7, wherein the received terrain information of the position of the host vehicle indicates that the host vehicle is located in a vicinity of an intersection.

* * * * *